(12) United States Patent
Mori et al.

(10) Patent No.: US 10,823,828 B2
(45) Date of Patent: Nov. 3, 2020

(54) OBJECT CAPTURING DEVICE

(71) Applicant: HOKUYO AUTOMATIC CO., LTD., Osaka-shi, Osaka (JP)

(72) Inventors: Toshihiro Mori, Osaka (JP); Akihito Yamamoto, Osaka (JP); Masayuki Maeda, Osaka (JP); Takahiro Kasahara, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 0 days.

(21) Appl. No.: 16/484,406

(22) PCT Filed: Feb. 8, 2018

(86) PCT No.: PCT/JP2018/004347
§ 371 (c)(1),
(2) Date: Aug. 7, 2019

(87) PCT Pub. No.: WO2018/150999
PCT Pub. Date: Aug. 23, 2018

(65) Prior Publication Data
US 2019/0391245 A1 Dec. 26, 2019

(30) Foreign Application Priority Data
Feb. 17, 2017 (JP) .................................. 2017-027778

(51) Int. Cl.
*G01S 7/499* (2006.01)
*G01S 17/08* (2006.01)
(Continued)

(52) U.S. Cl.
CPC .............. *G01S 7/499* (2013.01); *G01S 17/08* (2013.01); *G01S 17/42* (2013.01); *G01S 17/46* (2013.01); *G01S 17/93* (2013.01); *G05D 1/02* (2013.01)

(58) Field of Classification Search
CPC .......... G01S 7/499; G01S 17/08; G01S 17/42; G01S 17/46; G01S 17/93; G05D 1/02
(Continued)

(56) References Cited

U.S. PATENT DOCUMENTS

2017/0074652 A1\* 3/2017 Send ..................... G06F 3/0304

FOREIGN PATENT DOCUMENTS

JP 2004-191063 A 7/2004
JP 2007-25745 A 2/2007
(Continued)

OTHER PUBLICATIONS

Mar. 13, 2018 Search Report issued in International Patent Application No. PCT/JP2018/004347.
(Continued)

*Primary Examiner* — Roy M Punnoose
(74) *Attorney, Agent, or Firm* — Oliff PLC

(57) ABSTRACT

An object capturing device configured to capture an object present in a measurement target space includes a light emission unit, a light receiving unit, a light scanning unit configured to cause measurement light emitted at a predetermined wavelength from the light emission unit to head toward a measurement target space to perform scanning, and to guide reflected light from an object present in the measurement target space with respect to the measurement light to the light receiving unit, and a polarization filter disposed in the light scanning unit, the polarization filter including a polarizer configured to allow only light vibrating in a first direction in the measurement light to transmit, and an analyzer configured to allow only light vibrating in a second direction perpendicular to the first direction in the reflected light to transmit.

10 Claims, 19 Drawing Sheets

(51) Int. Cl.
  *G01S 17/42*   (2006.01)
  *G01S 17/46*   (2006.01)
  *G01S 17/93*   (2020.01)
  *G05D 1/02*    (2020.01)

(58) Field of Classification Search
  USPC .......................................................... 356/369
  See application file for complete search history.

(56) References Cited

FOREIGN PATENT DOCUMENTS

| | | |
|---|---|---|
| JP | 2007-170917 A | 7/2007 |
| JP | 2009-063339 A | 3/2009 |
| JP | 2009-229458 A | 10/2009 |
| JP | 2011-69671 A | 4/2011 |

OTHER PUBLICATIONS

Mar. 13, 2018 Written Opinion of the International Searching Authority issued in International Patent Application No. PCT/JP2018/004347.

* cited by examiner

| MATERIAL | PRODUCT NO. | MANUFACTURER |
|---|---|---|
| REFLECTING PLATE | 4090 | SUMITOMO 3M |
| NEW ALUMINUM | CFNP06641150 | ASKA |
| SUS (ELECTROLYTIC POLISHING) | CFNP07021630 | NISSIN SANGYO |
| SUS (BA MATERIAL) | CFNP07021730 | NISSIN SANGYO |
| WHITE KENT PAPER | --- | --- |
| ALPOLIC (WHITE) | CFNP07021740 | NAGOYA JUSHI |
| KAIDAK (BLACK) | 5015 | NITTO |
| POLYCARBONATE | PC1600 (TRANSPARENT) | TAKIRON |

Fig.18

OBJECT CAPTURING DEVICE

This application is based on an application No. 2017-027778 filed in Japan, the contents of which are hereby incorporated by reference.

FIELD OF THE INVENTION

The present invention relates to an object capturing device configured to capture a certain object from among objects present in a measurement target space.

DESCRIPTION OF THE RELATED ART

In a manufacturing facility for semiconductor devices, carrying carts are used to convey wafer carrier devices each accommodating a plurality of semiconductor wafers from a loading port of a manufacturing device to a loading port of another manufacturing device. Such a carrying cart is referred to as a ceiling-traveling type automated guided vehicle, or overhead hoist transfer (OHT).

To avoid each of the carrying carts from coming into contact with an obstruction, such as a person or a machine, the carrying carts each include a traveling section configured to autonomously travel along a traveling rail defining a route, which is arranged in a space above manufacturing devices, and an item accommodating section being supported by the traveling section. The item accommodating section is assembled with a lifting and lowering mechanism configured to lift and lower, along a predetermined lifting and lowering passage, a lifted and lowered member provided with a chuck mechanism configured to grab each of the wafer carrier devices representing conveyance target objects.

To convey the wafer carrier devices in accordance with a layout of the manufacturing devices, the route has a complex shape including not only simple straight portions, but also curves, branched portions, and merging portions, for example. The manufacturing facility is constructed to allow the plurality of carrying carts to travel at intervals on the route.

To increase efficiency in conveying wafer carrier devices, many carrying carts have been demanded to travel at higher speeds on the route in the manufacturing facility. Since, to achieve this demand, inter-vehicular distances between carrying carts have been prone to be shorter, such a mechanism is necessary that prevents contingent collisions from occurring.

Patent document 1 discloses such a technique that carrying carts are each provided with an inter-vehicular distance sensor, such as a laser range finder, to avoid the carrying carts from colliding with each other. Based on an inter-vehicular distance measured by the inter-vehicular distance sensor, a relative speed to another proceeding one of the carrying carts is calculated. Based on the relative speed, a travel speed of each of the carrying carts is controlled to avoid a collision.

However, since, in such a case where a proceeding carrying cart travels a curve on the route, the proceeding carrying cart disappears from a scanning range of measurement light output from the laser range finder, this case may result in that not only the proceeding carrying cart cannot be detected, but also reflected light from, for example, an exterior panel of a manufacturing device or another traveling cart is erroneously detected as reflected light from the proceeding carrying cart.

To solve this problem, Patent document 2 proposes a distance measurement device that includes, at a front section of a carrying cart configured to travel along a route, a ranging device including a scanner configured to perform scanning in a plane shape with measurement light being modulated, and a distance calculation unit configured to calculate a distance to an object to be detected based on a time delay between the measurement light used for scanning by the scanner and reflected light from the object to be detected, and that is configured to detect, based on reflected light, which is detected by the ranging device, from a recursive reflecting member disposed at a rear section of a proceeding carrying cart, an inter-vehicular distance between the carrying carts.

The distance measurement device includes an identifying unit configured to identify whether reflected light from the recursive reflecting member is received based on an inter-relationship between at least two out of a plurality of scanning angles of measurement light used for scanning by the scanner, distances that correspond to the scanning angles and that are calculated by the distance calculation unit, and values of intensity of reflected light, which correspond to the scanning angles.

PRIOR ART DOCUMENT

[Patent document 1] Japanese Unexamined Patent Application Publication No. 2007-25745
[Patent document 2] Japanese Unexamined Patent Application Publication No. 2011-69671

SUMMARY OF INVENTION

Problems to be Solved by the Invention

However, even the distance measurement device described in Patent document 2 could not completely eliminate to misidentify reflected light from a wall surface of a manufacturing device as reflected light from the recursive reflecting member mounted on the carrying cart.

One reason is that, depending on a distance of separation between the distance measurement device and a wall surface irradiated with measurement light, reflection properties of the wall surface irradiated with the measurement light are similar to reflection properties of the recursive reflecting member disposed at the rear section of the carrying cart. Such a case corresponds to, for example, a case where a wall surface is made from a metal plate made of aluminum or other metals and measurement light is incident on the wall surface in a substantially vertical direction, or a case where a wall surface is an embossed, white painted surface.

In the cases described above, such an extremely burdensome separate adjustment on an interrelationship serving as a reference for determination is required per manufacturing facility to avoid erroneous determinations.

Similar problems can occur in not only ceiling-traveling type automated guided vehicles and OHTs described above, but also carrying carts each configured to be guided to a plurality of landmarks disposed along a traveling passage to travel in an automated manner to a destination without being departed from the traveling passage. Such a carrying cart is collectively referred to as an automated guided vehicle (AGV).

An AGV is equipped with a distance measurement device configured to scan landmarks disposed along a passage by measurement light to detect reflected light from recursive reflecting members respectively constituting the landmarks and to confirm a position or to detect an obstruction, such as a person or an object, present on the traveling passage.

Even such an AGV, however, may deviate from the traveling passage when reflected light from a wall surface of a manufacturing device, for example, is erroneously determined as reflected light from one of the landmarks.

In view of the problems described above, the present invention has an object to provide an object capturing device capable of determining whether an object is a capture target.

Means For Solving the Problems

A first characteristic configuration of an object capturing device according to the present invention is, as described in claim 1 in the appended claims, an object capturing device configured to capture an object present in a measurement target space, and including a light emission unit, a light receiving unit, a light scanning unit configured to cause measurement light emitted at a predetermined wavelength from the light emission unit to head toward a measurement target space to perform scanning, and to guide reflected light from an object present in the measurement target space with respect to the measurement light to the light receiving unit, and a polarization filter disposed in the light scanning unit, the polarization filter including a polarizer configured to allow only light vibrating in a first direction in the measurement light to transmit, and an analyzer configured to allow only light vibrating in a second direction perpendicular to the first direction in the reflected light to transmit.

In measurement light emitted from the light emission unit, only linearly polarized light vibrating in the first direction is allowed to transmit the polarizer for scanning in a measurement target space. Meanwhile, in reflected light from an object, only linearly polarized light vibrating in the second direction perpendicular to the first direction is allowed to transmit the analyzer, and is guided to the light receiving unit. With the light scanning unit provided with the polarizer and the analyzer, neither measurement light along scanning nor reflected light change in polarization direction. With such reflection properties of a reflection surface of a capture target that cause a polarization direction of measurement light to rotate 90 degrees, the capture target can be surely identified.

A second characteristic configuration of the object capturing device according to the present invention is that, as described in claim 2 in the appended claims, in addition to the first characteristic configuration described above, a circular polarizing plate may be disposed between the light emission unit and the polarizer.

By allowing measurement light to pass through the circular polarizing plate to be circularly polarized, and then to be incident on the polarizer, linearly polarized light vibrating in the first direction can be easily obtained. As a result, such an adjustment is not required, on a relative positional relationship between the light emission unit and the polarizer, that of allowing a polarization direction of linearly polarized light in light emitted from the light emission unit and a polarization direction by the polarizer to align with each other.

A third characteristic configuration of the object capturing device according to the present invention is that, as described in claim 3 in the appended claims, in addition to the second characteristic configuration described above, a second polarizer may be disposed between the light emission unit and the circular polarizing plate.

By adjusting the second polarizer to allow a polarization surface to receive incident light at a bearing angle of 45 degrees relative to a fast axis or a slow axis of the circular polarizing plate, linearly polarized light can turn into circularly polarized light forming a substantially perfect circle. As a result, with the polarizer provided in the light scanning unit, measurement light appropriately linearly polarized can be obtained.

A fourth characteristic configuration of the object capturing device according to the present invention is that, as described in claim 4 in the appended claims, in addition to any one of the first to third characteristic configurations described above, the light scanning unit may include a deflecting mirror and a light guide unit defining an optical path configured to guide measurement light deflected by the deflecting mirror to the measurement target space and an optical path configured to guide the reflected light to the light receiving unit. Furthermore, the polarizer may be disposed on a measurement light optical path side of the light guide unit. Meanwhile, the analyzer may be disposed on a reflected light optical path side of the light guide unit.

The light guide unit defines regions of optical paths into the measurement light optical path and the reflected light optical path. When measurement light emitted from the light emission unit travels through the measurement light optical path, only linearly polarized light vibrating in the first direction passes through the polarizer to reach a measurement target space to achieve scanning. When reflected light from an object advances into the reflected light optical path, only linearly polarized light vibrating in the second direction perpendicular to the first direction passes through the analyzer. The reflected light is then received by the light receiving unit.

A fifth characteristic configuration of the object capturing device according to the present invention is that, as described in claim 5 in the appended claims, an object capturing device configured to capture an object present in a measurement target space includes a light emission unit, a light receiving unit, and a light scanning unit to transmit measurement light emitted at a predetermined wavelength from the light emission unit toward a measurement target space, and to guide reflected light from an object present in the measurement target space with respect to the measurement light to the light receiving unit. The light scanning unit includes a light guide unit defining an optical path configured to guide measurement light deflected by the deflecting mirror to the measurement target space and an optical path configured to guide the reflected light to the light receiving unit and a half mirror disposed on a measurement light optical path side of the light guide unit configured to guide the reflected light to the light receiving unit.

In a case where the half mirror is not provided, and an object to be irradiated with measurement light lies adjacent to the object capturing device, a diameter of a measurement light beam emitted from the light guide unit reduces. As well as a degree of expansion of a reflected light beam from the object reduces. As a result, a diameter of reflected light beam advancing in the reflected light optical path becomes closer to a diameter of measurement light advancing in the measurement light optical path. As well as, a quantity of light guided to the light receiving unit reduces. In this case, such a situation may occur that a distance is not precisely detected. Even in a case, by providing a half mirror, reflected light from the object is reflected by the half mirror, and is guided to the light receiving unit. As a result, even an adjacent object can be precisely detected.

A sixth characteristic configuration of the object capturing device according to the present invention is that, as described in claim 6 in the appended claims, in addition to any one of the first to fifth characteristic configurations described above, the object capturing device may include a casing. A part of the casing serving as a path for the measurement light and the reflected light is made of a material which transmits the measurement light and has low polarization properties with respect to the measurement light.

By using a material having low polarization properties, as a material constituting a part of the casing, which serves as a path for measurement light and reflected light, i.e., an optical window, properties of polarizing measurement light and reflected light passing through the optical window can be suppressed from changing, avoiding detection accuracy from lowering.

A seventh characteristic configuration of the object capturing device according to the present invention is that, as described in claim 7 in the appended claims, in addition to any one of the first to sixth characteristic configurations described above, the light emission unit may include a plurality of light sources configured to emit light at different wavelengths, the light emission unit being switched and driven in synchronization with a scanning period of the light scanning unit.

The plurality of light sources configured to emit light at different wavelengths are switched and driven in synchronization with a scanning period of the light scanning unit. During at least one scanning period, scanning is performed with measurement light at a constant wavelength. During the one scanning period, the wavelength of the measurement light does not change.

Effects of Invention

As described above, according to the present invention, an object capturing device capable of determining whether an object is a capture target can be provided.

BRIEF DESCRIPTION OF THE DRAWINGS

FIG. 18 is a diagram illustrating materials of the reflecting plates (reflecting members).

DESCRIPTION OF THE PREFERRED EMBODIMENTS

Here will describe an embodiment where an object capturing system assembled with an object capturing device according to the present invention is applied to each of automated carrying carts provided in a manufacturing facility for semiconductor devices.

Figure 1:
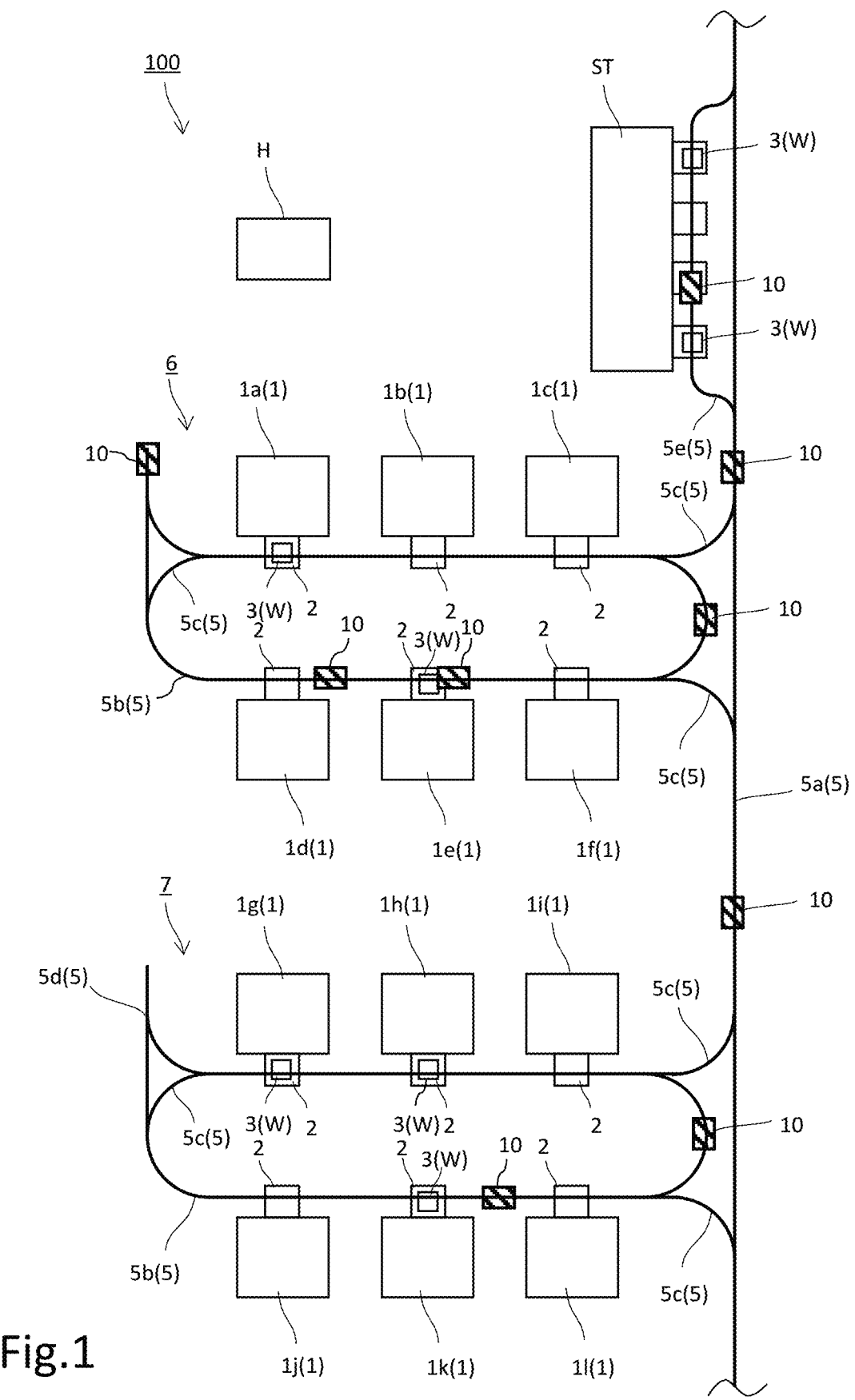
FIG. 1 is a diagram illustrating a manufacturing facility for semiconductor devices and carrying carts configured to move along a traveling rail.

As illustrated in FIG. 1, a manufacturing facility 100 for semiconductor devices includes various manufacturing devices 1 (1a to 11) that are arranged along a predetermined route and that sequentially execute predetermined processing on semiconductor wafers, a traveling rail 5 suspended from a ceiling in such a manner as to extend along the manufacturing devices 1, and a plurality of carrying carts (OHTs) 10 that travel along the traveling rail 5 to automatically convey semiconductor wafers W among the manufacturing devices 1 (1a to 11). The manufacturing devices 1 (1a to 11) are separately provided in bays 6 and 7 per a series of manufacturing steps. Wafer carriers 3 each accommodate the plurality of semiconductor wafers W.

The traveling rail 5 includes not only simple straight portions, but also curves, branched portions, and merging portions, for example. For example, the traveling rail 5 includes inter-step rails 5a respectively coupling the bays 6 and 7, in-step rails 5b respectively coupling the manufacturing devices 1 in the bays 6 and 7, branched rails 5c respectively coupling the inter-step rails 5a and the in-step rails 5b, side rails 5d with which the carrying carts 10 running on the in-step rails 5b are sidetracked, and bypass rails 5e with which the carrying carts 10 respectively pick up or load the wafer carriers 3 on stockers ST.

The branched rails 5c respectively couple the inter-step rails 5a and the in-step rails 5b, allowing the carrying carts 10 to travel along the branched rails 5c to move back and forth among the inter-step rails 5a and the in-step rails 5b.

The side rails 5d are respectively branched from the in-step rails 5b, and are used for temporarily sidetracking the carrying carts 10 from the in-step rails 5b for allowing the carrying carts 10 to undergo maintenance services, for example.

The bypass rails 5e are respectively branched from the inter-step rails 5a, and are used for a case where one of the wafer carriers 3, which is held by one of the carrying carts 10 traveling on the inter-step rails 5a, is to be temporarily stored on one of the stockers ST.

Figure 2:
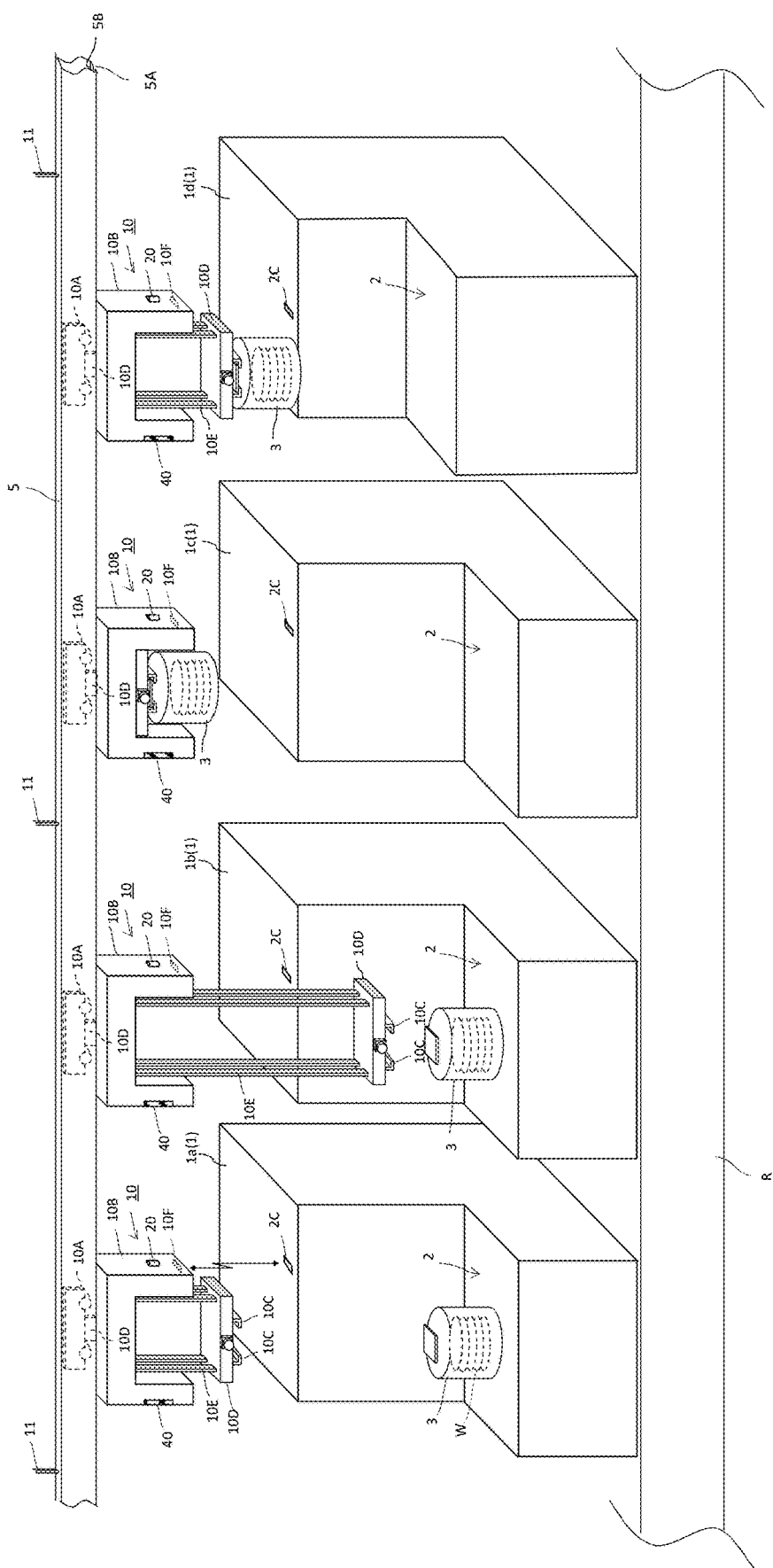
FIG. 2 is a diagram illustrating processing of transferring wafer carriers among the carrying carts and manufacturing devices.
Figure 3:
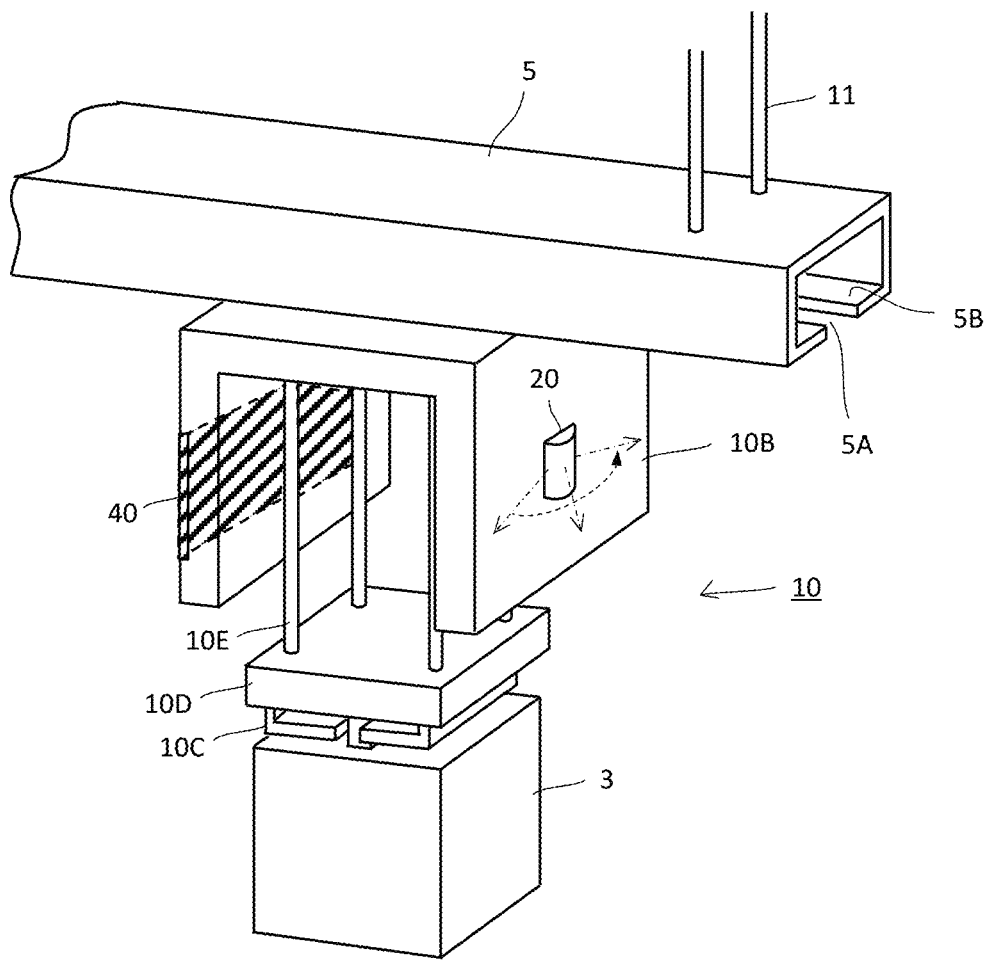
FIG. 3 is a perspective view of one of the carrying carts.

As illustrated in FIGS. 2 and 3, the traveling rail 5 is suspended from the ceiling by support members 11 at appropriate intervals, and is made from a pipe shaped member having a rectangular cross-sectional shape formed, on its lower wall, with a slit an opening 5A having a slit shape extending in a longitudinal direction. The carrying carts 10 each include a traveling section 10A that travels along an upper surface 5B of an inner side of the lower wall of the pipe shaped member while sandwiching the opening 5A, and a holding section 10B that is coupled with the traveling section 10A with a coupling member 10D and positioned below the lower wall of the pipe shaped member.

The traveling section 10A includes a traveling base and a front-rear pair of wheels attached to the traveling base, as well as is mounted with, for example, a conveyance control unit configured to control a traveling motor configured to drive the wheels and a lifting and lowering mechanism 10E described later to convey each of the wafer carriers 3 to a target one of the manufacturing devices 1.

Figure 4:
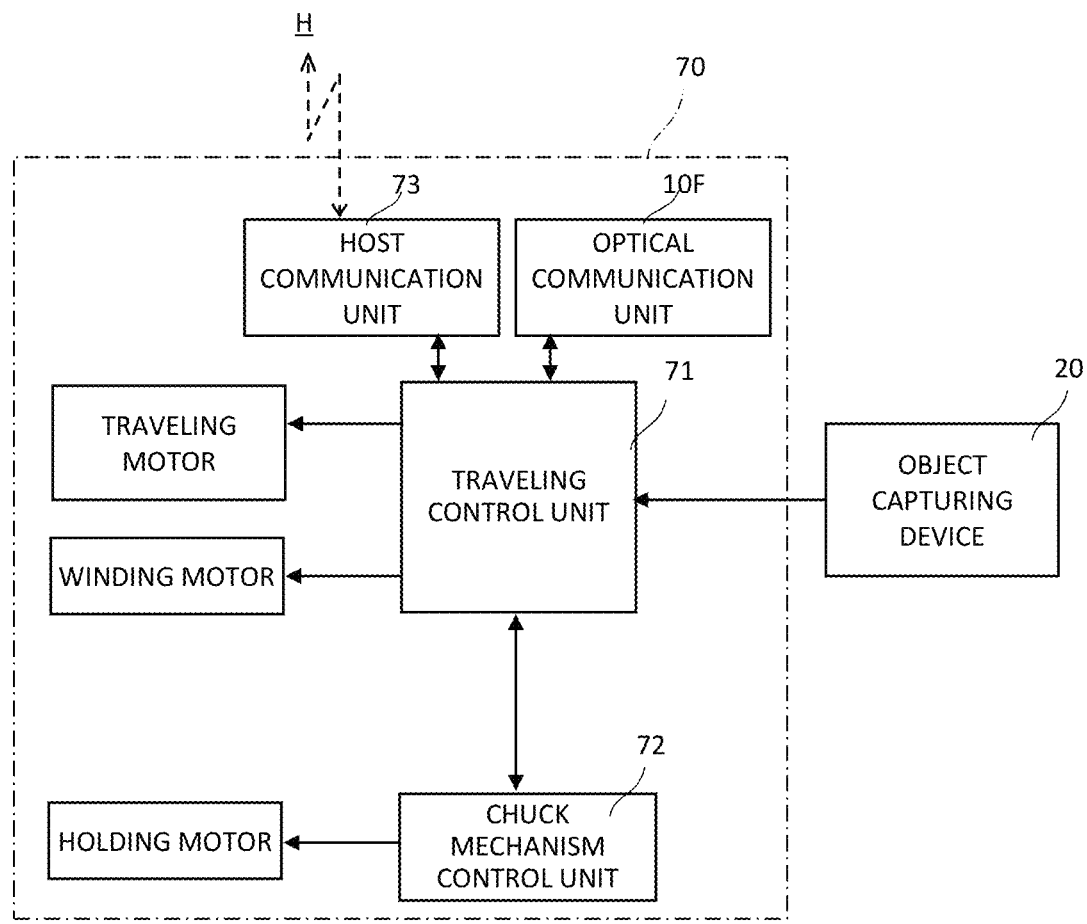
FIG. 4 is a functional block diagram illustrating a conveyance control unit mounted on each of the carrying carts.

FIG. 4 illustrates a functional block configuration of a conveyance control unit 70 mounted on each of the carrying carts 10. The conveyance control unit 70 includes a traveling control unit 71 including a microcomputer and its peripheral circuits, a chuck mechanism control unit 72 coupled to the traveling control unit 71, a host communication unit 73, and an optical communication unit 10F, for example.

Based on an instruction from a system controller H (see FIG. 1), the conveyance control unit 70 performs a control to hold one of the wafer carriers 3 placed on one of loading ports 2 of the manufacturing devices 1 (1a to 11), to travel among the manufacturing devices 1 or among the stockers ST each configured to temporarily store the wafer carriers 3, and to place the one of the wafer carriers 3 on a destination of conveyance, i.e., another one of the loading ports 2.

The holding section 10B is assembled with a lifted and lowered member 10D including a chuck mechanism 10C configured to hold one of the wafer carriers 3, and the lifting and lowering mechanism 10E including a belt and a winding motor configured to lift and lower the lifted and lowered member 10D along a predetermined lifting and lowering passage.

On a bottom surface of the holding section 10B, the optical communication unit 10F configured to locally communicate with an optical communication unit 2C provided in each of the manufacturing devices 1 is assembled. After arrival at a position adjacent to a target one of the manufacturing devices 1 based on an instruction from the system controller H, when recognizing that an optical communication has been established between the optical communication units 2C and 10F, the traveling control unit 71 performs a control to stop the traveling motor. A signal transmission medium for local communications may be a radio communication medium, and may use radio waves, for example, instead of light. That is, instead of the optical communication unit, a wireless communication unit may be used.

Furthermore, when the winding motor is controlled to lower the lifting and lowering mechanism 10E, and a holding motor configured to be driven via the chuck mechanism control unit 72 is caused to hold one of the wafer carriers 3, the winding motor is controlled to lift the lifting and lowering mechanism 10E, and the one of the wafer carriers 3 is conveyed to a destination of conveyance, i.e., one of the manufacturing devices 1, for example.

As illustrated in FIG. 3, in the holding section 10B, an object capturing device 20 is assembled on a front surface side in a traveling direction of each of the carrying carts 10, and a reflecting sheet 40 having a predetermined size is applied on a rear surface side in the traveling direction.

Figure 5A:
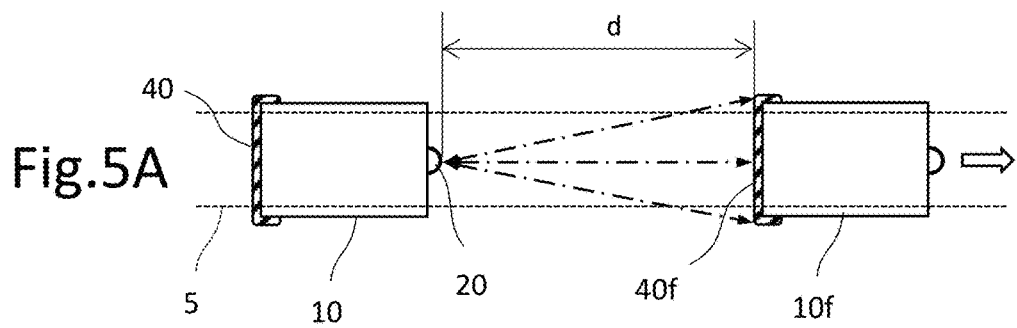
FIGS. 5A, 5B, and 5C are diagrams each illustrating a positional relationship of two of the carrying carts configured to move along the traveling rail.
Figure 5B:
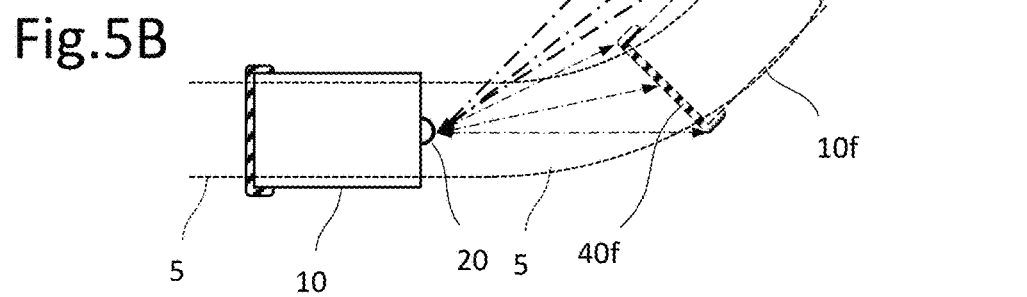
Figure 5C:
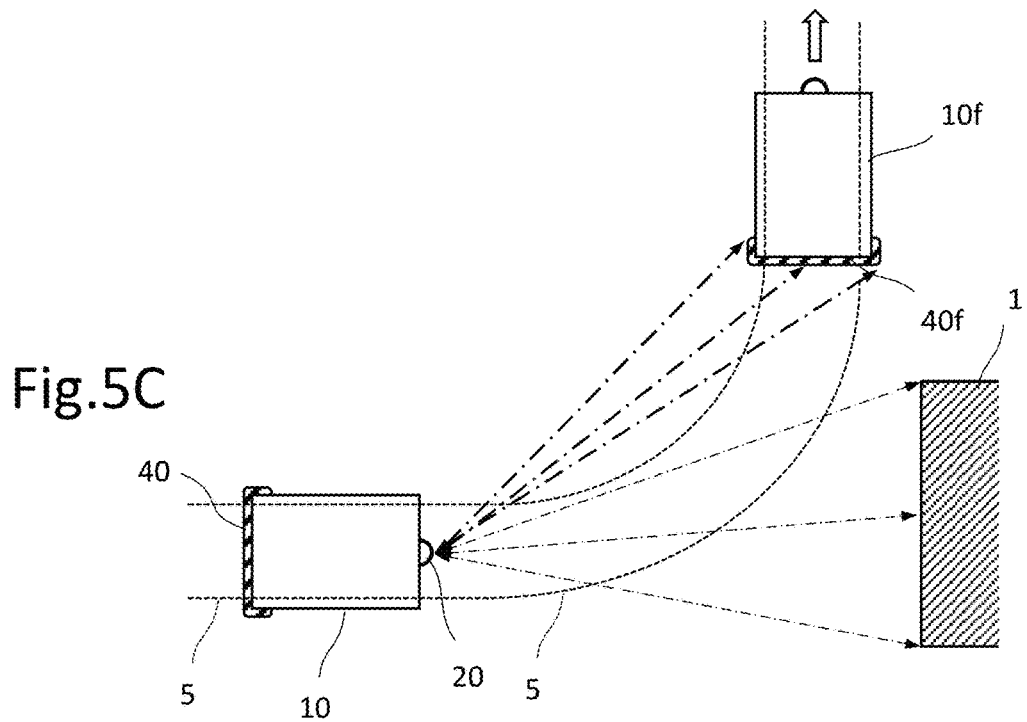

As illustrated in FIGS. 5A to 5C, the object capturing device 20 is configured to emit measurement light forward, i.e., in an advancing direction, to perform scanning, to detect reflected light from a reflecting sheet 40f applied on a proceeding carrying cart 10f to calculate an inter-vehicular distance to the proceeding carrying cart 10f and to output the calculated inter-vehicular distance to the conveyance control unit 70 (traveling control unit 71). When determining that an inter-vehicular distance input from the object capturing device 20 is shorter than an allowable value, the conveyance control unit 70 performs a control to cause a corresponding one of the carrying carts 10 to decelerate or stop to avoid collision. Such a control unit may be provided in the object capturing device 20 that is configured to output a control signal controlling and causing each of the carrying carts 10 to decelerate or stop to avoid collision.

In a case where another proceeding carrying cart enters, from a straight traveling rail, as illustrated in FIG. 5A, a curved traveling rail, as illustrated in FIG. 5B, if reflected light from a panel, for example, of one of the manufacturing devices 1, which is mounted on a line extending from a portion immediately before the curved portion of the traveling rail 5, as illustrated in FIG. 5C, is erroneously detected as reflected light from the reflecting sheet 40f applied on the proceeding carrying cart 10f, and a corresponding one of the carrying carts 10 is caused to decelerate or stop, the corresponding one of the carrying carts 10 faces difficulty in restarting traveling from the stopped state. To prevent such an event, the object capturing device 20 is provided with an object determination unit configured to determine whether reflected light being detected is reflected light from the reflecting sheet 40f applied on a proceeding carrying cart.

The object capturing device 20 will be described herein in detail.

[Object Capturing Device According to First Embodiment]

Figure 6:
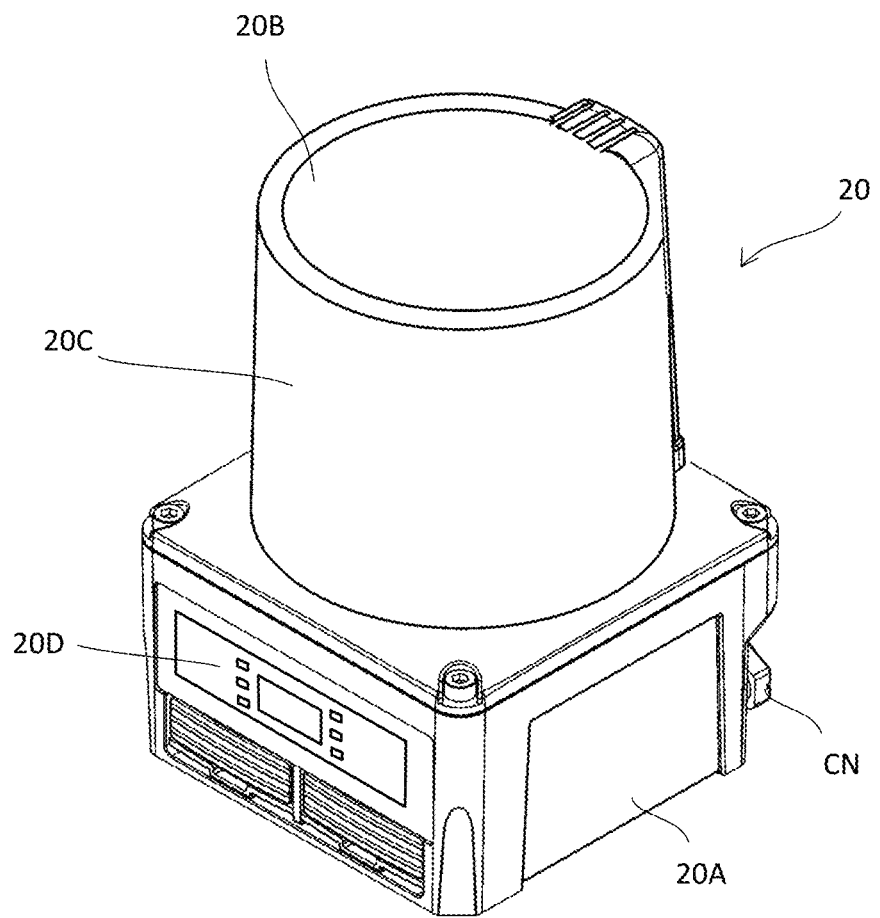
FIG. 6 is a diagram illustrating an appearance of an object capturing device.
Figure 7:
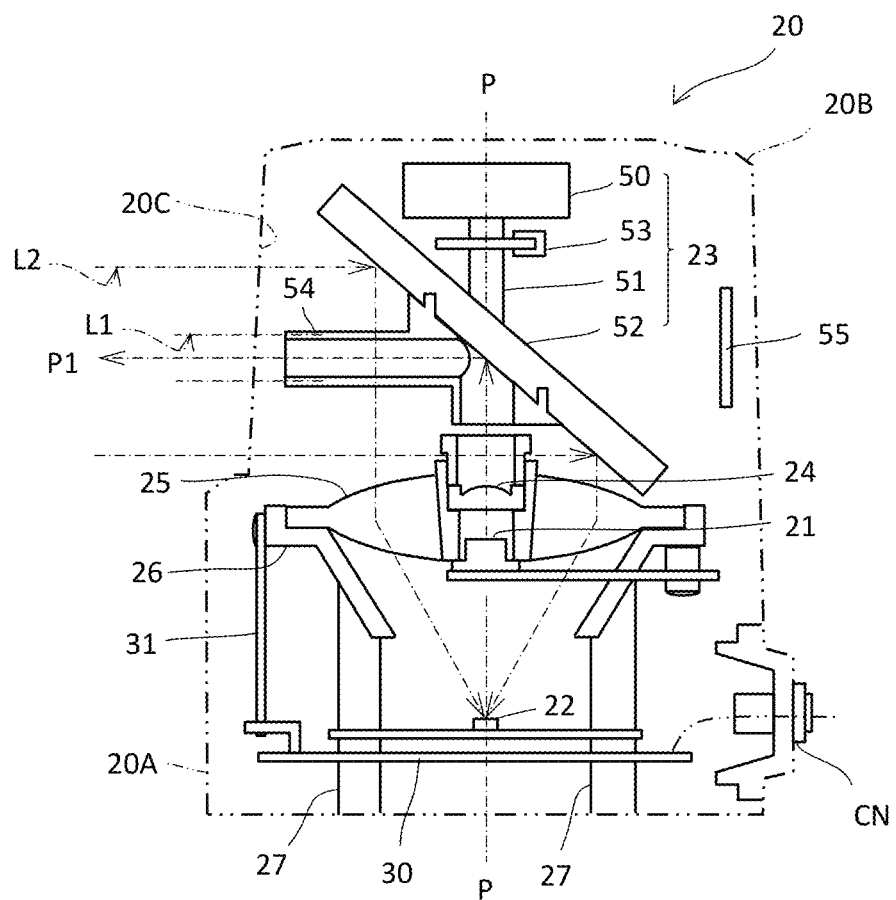
FIG. 7 is a diagram illustrating an internal structure of the object capturing device.

FIG. 6 illustrates an appearance of the object capturing device 20. FIG. 7 illustrates an internal structure of the object capturing device 20. As illustrated in FIG. 6, the object capturing device 20 includes a lower casing 20A having a substantially rectangular parallelepiped shape, and an upper casing 20B provided with an optical window 20C having a substantially cylindrical shape. The lower casing 20A is further provided with a signal coupling section CN and a display section 20D.

As illustrated in FIG. 7, the casings 20A and 20B of the object capturing device 20 accommodate a light emission unit 21, a light receiving unit 22, a light scanning unit 23, a light projection lens 24, a light receiving lens 25, and signal processing substrates 30 and 31.

The light scanning unit 23 includes a motor 50 provided on an inner wall of an upper surface of the upper casing 20B, and a deflecting mirror 52 that is fixed to a rotating shaft 51 of the motor 50 and that is integrally rotatable with the rotating shaft 51. The deflecting mirror 52 is set to have an inclination angle of 45 degrees relative to the rotating shaft 51. Furthermore, the rotating shaft 51 is provided with an encoder 53 configured to measure a rotational speed of the motor 50. The encoder 53 functions as a scanning angle detection unit with respect to measurement light.

On an optical axis P concentric with the rotating shaft 51 disposed in a perpendicular posture, as well as opposite to the motor 50 across the deflecting mirror 52, the light receiving lens 25 and the light receiving unit 22 are disposed at positions different from each other in upper and lower directions. At a central part of the light receiving lens 25, an opening part cut out into a cylindrical shape is formed. At a lower end of the opening part, the light emission unit 21 is disposed. Above the lower end, the light projection lens 24 is disposed.

A light guide unit 54 that is configured to integrally rotate with the deflecting mirror 52 and that defines a measurement light optical path L1 configured to guide measurement light deflected by the deflecting mirror 52 to a measurement target space and a reflected light optical path L2 configured to guide reflected light deflected by the deflecting mirror 52 to the light receiving unit 22 is fixed to the deflecting mirror 52 to be allowed to integrally rotate with the deflecting mirror 52.

The light emission unit 21 includes an infrared laser diode that is mounted on a substrate supported in a cantilever manner. After coherent measurement light emitted from the laser diode is formed into parallel light by the light projection lens 24, is incident on the deflecting mirror 52 along the optical axis P, and is deflected at an angle of 90 degrees, the measurement light passes through an inside region, i.e., the measurement light optical path L1, defined by the light guide unit 54 along the optical axis P1, and is emitted from the optical window 20C to a measurement target space.

A surface of an object present in the measurement target space is irradiated with the measurement light. After part of its reflected light enters from the optical window 20C along the optical axis P1, passes through an outside region, i.e., the reflected light optical path L2, defined by the light guide unit 54, becomes incident on the deflecting mirror 52, and is deflected by the deflecting mirror 52 at an angle of 90 degrees, the light is concentrated by the light receiving lens 25, and becomes incident on the light receiving unit 22.

As for the light receiving lens 25, a flange part formed on its peripheral part is supported by a lens holder 26. The substrate constituting the light emission unit 21 is supported by the lens holder 26. Furthermore, a substrate mounted with the light receiving unit 22 and the signal processing substrates 30 and 31 are supported by a plurality of legs 27 supporting the lens holder 26.

Furthermore, in the light guide unit 54 assembled in the light scanning unit 23, at positions facing the optical window 20C, a polarizer PL is disposed at an outlet end of the measurement light optical path L1, and an analyzer AN is disposed at an inlet end of the reflected light optical path L2. That is, the polarizer PL is disposed inside of the light guide unit 54, whereas the analyzer AN is disposed outside of the light guide unit 54.

The polarizer PL causes only light vibrating in the first direction to transmit to the optical path for measurement light. The analyzer AN causes only light vibrating in the second direction perpendicular to the first direction to transmit to the optical path for reflected light. In the light emission direction, at a position immediately behind the light projection lens 24, a ¼ wavelength plate 28 serving as an example of a circular polarizing plate is disposed.

A measurement light linearly polarized in a predetermined direction is emitted from the laser diode of the light emission unit 21 and passes through the ¼ wavelength plate 28 to turn into circularly polarized light. And the circularly polarized light further passes through the polarizer PL to turn into linearly polarized light in a direction perpendicular to a scanning direction, for example.

As each of the polarizer PL and the analyzer AN, for example, such a wire grid can be used that a fine metal grid is formed on a surface of a glass plate. Otherwise, such a crystalline material can be used that utilizes a birefringence phenomenon of the material itself to adjust polarized components.

By disposing, on a reflection surface of a capture target, such an optical member that causes a polarization direction to rotate 90 degrees, a polarization direction of reflected light rotates 90 degrees relative to a polarization direction of measurement light. As such an optical member, a recursive reflecting sheet arranged with a trihedron cube corner element or a ½ wavelength plate is preferably used.

Figure 13A:
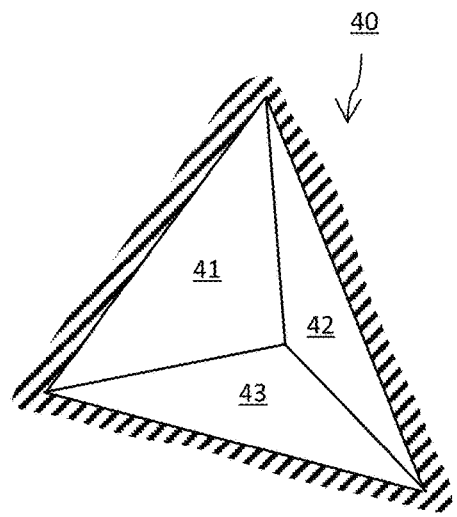
FIGS. 13A and 13B are diagrams each illustrating a recursive reflecting member used as a reflecting sheet.

FIG. 13A illustrates a trihedron cube corner element (also referred to as a microprism). Three reflecting mirrors 41, 42, and 43 perpendicular to each other constitute a unit element. Light that is incident on such a trihedron cube corner element is reflected in an incident direction.

Figure 13B:
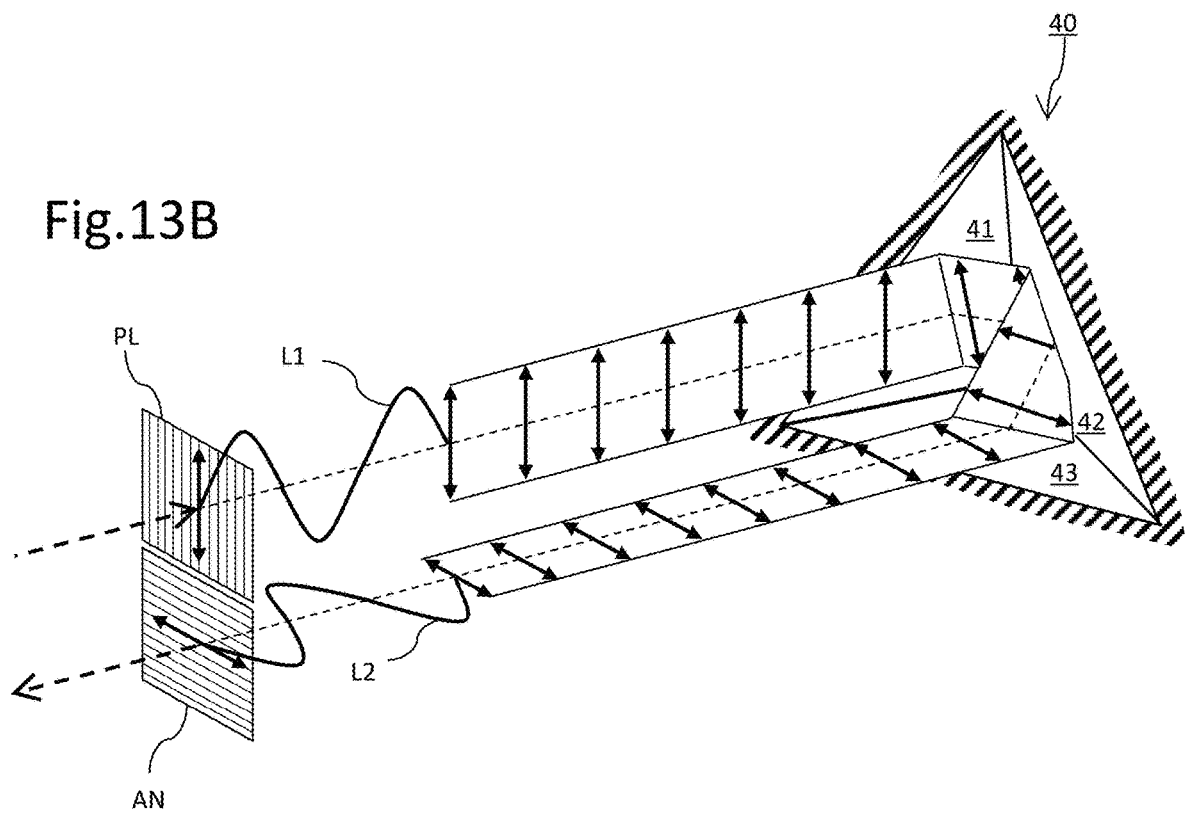

As illustrated in FIG. 13B, as measurement light passed through the polarizer PL and being linearly polarized in a vertical direction is reflected by the three surfaces of the trihedron cube corner element, the measurement light turns into linearly polarized light in a polarization direction rotated 90 degrees. The linearly polarized light then passes through the analyzer AN.

Even when measurement light passed through the polarizer PL is reflected by a metal plate made of aluminum, for example, reflected light does not change its polarization direction. Accordingly, the reflected light does not pass through the analyzer AN. When measurement light passed through the polarizer PL is reflected by a white scatter plate, its polarization direction is disturbed. The measurement light then turns into reflected light where circularly polarized light and linearly polarized light in directions at various angles overlap with each other. As a result, a quantity of reflected light passing through the analyzer AN is approximately halved.

As the polarizer PL and the analyzer AN included in the light scanning unit 23 rotate integrally with the deflecting mirror 52, neither measurement light emitted along scanning nor reflected light being incident change in polarization direction. With such reflection properties of a reflection surface of a capture target that cause a deflecting direction of measurement light to rotate 90 degrees, the capture target can be surely identified.

It is preferable that, to prevent polarization properties from changing even when light passes through the optical window 20C, as a material constituting the optical window 20C serving as a passage for measurement light and reflected light, such a material, as an acrylic resin or optical glass having lower birefringence, be used that allows measurement light to transmit and that has lower polarization properties with respect to measurement light.

The signal processing substrate 30 is provided with a control unit 80 configured to control the object capturing device 20. The signal processing substrate 31 is mounted with light-emitting diodes (LEDs) and a liquid crystal display element respectively configured to display various kinds of information on the display section 20D. The signal processing substrate 30, the light emission unit 21, and the light receiving unit 22 are coupled with each other via signal lines. From the signal processing substrate 30, a signal cable configured to allow signals to be exchanged, via the signal coupling section CN provided to the lower casing 20A, with an external device extends.

Figure 8:
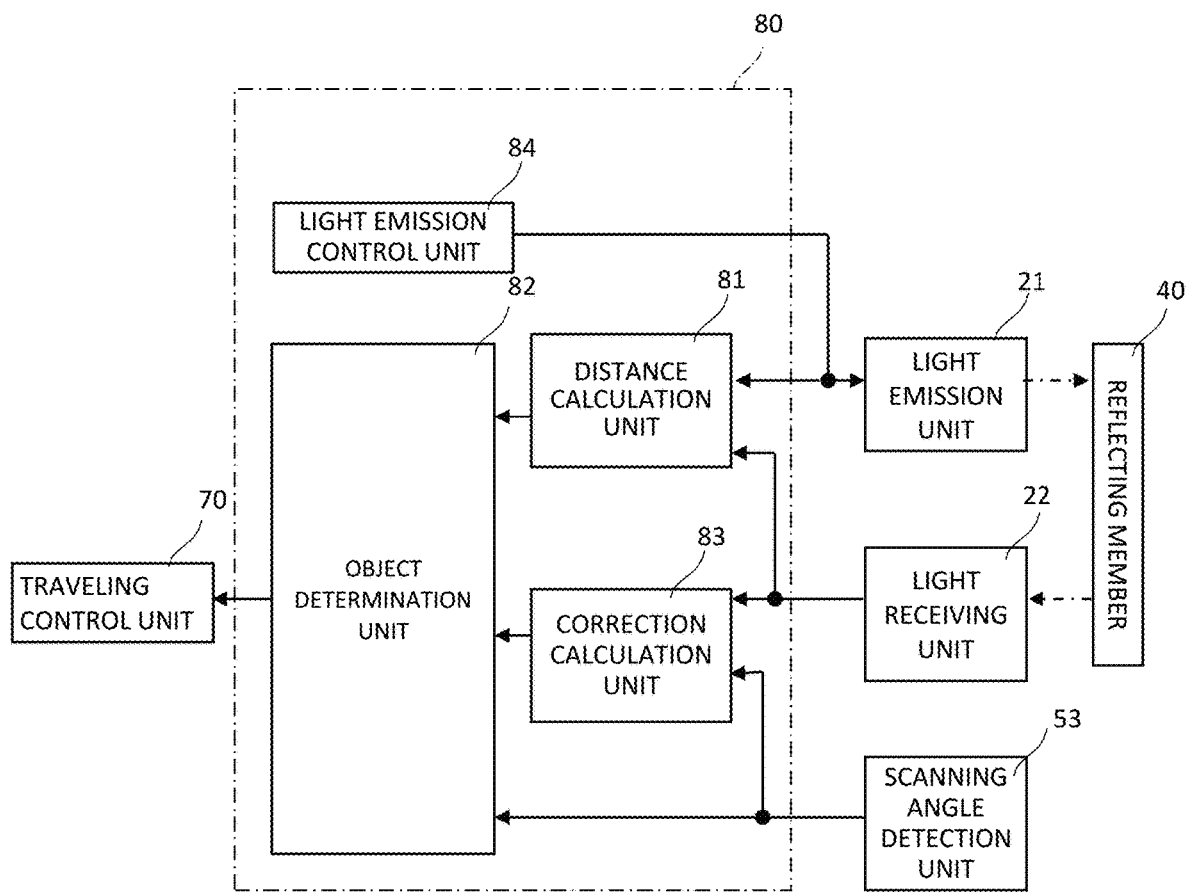
FIG. 8 is a functional block diagram illustrating a control unit assembled in the object capturing device.

FIG. 8 illustrates a functional block configuration of the control unit 80. The control unit 80 includes a microcomputer and a digital signal processor, for example, and therefore includes a light emission control unit 84 configured to control a light-emitting timing for the light emission unit 21, a distance calculation unit 81 configured to calculate, based on a time difference or a phase difference between measurement light used for scanning by the light scanning unit 23 and reflected light from an object, a distance to the object to be detected, a correction calculation unit 83 configured to correct the distance calculated by the distance calculation unit 81, and an object determination unit 82.

A method for calculating a distance based on a time difference between measurement light and reflected light is referred to as a time-of-flight (TOF) method. A distance d is calculated with a mathematical expression 1 described below. Where, C is a velocity of light, and ΔT is a time difference.

$$d=(1/2) \times C/\Delta T \qquad \text{[Mathematical expression 1]}$$

A method for calculating a distance based on a phase difference between measurement light that is emitted from a light source and that is allowed to undergo amplitude modulation (AM) at a predetermined modulation frequency and reflected light is referred to as an AM method, where a distance d is calculated with a mathematical expression 2 described below. Where, φ is a measured phase difference, C is a velocity of light, and F is a modulation frequency of the light source.

$$d=(1/2) \times (\varphi/2\pi) \times C/F \qquad \text{[Mathematical expression 2]}$$

The correction calculation unit 83 is a block configured to correct an error due to variation in component of the object capturing device 20, for example, as well as is a functional block configured to obtain a correction factor used to allow a distance calculated based on reflected light from a reference reflecting plate 55 provided on a part of the inner wall of the upper casing 20B to be a predetermined distance.

The description continues below with reference to an example where the TOF method is adopted. The description can also be applied to a case where the AM method is adopted.

The object determination unit 82 is configured to use a scanning angle detected by the scanning angle detection unit 53 and a distance obtained by correcting with a correction factor calculated by the correction calculation unit 83 a distance calculated by the distance calculation unit 81 in accordance with the scanning angle (hereinafter will be simply referred to as a "distance calculated by the distance calculation unit 81") to recognize a distance and a direction to a reflection position of measurement light, i.e., to the reflection position from the object capturing device 20, to determine, based on a plurality of the reflection positions determined from the recognized distances and the directions, whether a detected object is a capture target, as well as to output, when the detected object is the capture target, the distance and/or the direction to the traveling control unit 71 of a corresponding one of the carrying carts 10.

Specification values of the object capturing device 20 described in the present embodiment are a detection distance ranging from 50 mm to 7000 mm inclusive, a scanning angle range of 270 degrees, a scanning time of 25 ms, and an angular resolution of 0.25 degrees. A lateral size and a longitudinal size of the reflecting sheet 40 are 300 mm and 270 mm, respectively. However, the specification values are mere examples. The present invention does not intend to limit the specification values to the values described above.

The object determination unit 82 is configured to recognize, as a size along a scanning direction of an object, a continuous scanning angle range within which a difference in distance between a scanning angle calculated by the distance calculation unit 81 and each of scanning angles adjacent to the scanning angle is determined to be equal to or less than a predetermined threshold value, and to determine whether an object is a capture target based on a determination of whether the scanning angle range corresponds to a reference scanning angle range of the capture target, and whether intensity distribution of reflected light within the scanning angle range corresponds to reference intensity distribution of reflected light from the capture target.

The reference scanning angle range of a capture target refers to a scanning angle range corresponding to a reference distance representing distances calculated within the scanning angle range. As the reference distance, a minimum distance and a maximum distance from the object capturing device 20 to an object, as well as a central value and an average value, for example, can be used. In the present embodiment, an average value is used.

Figure 9A:
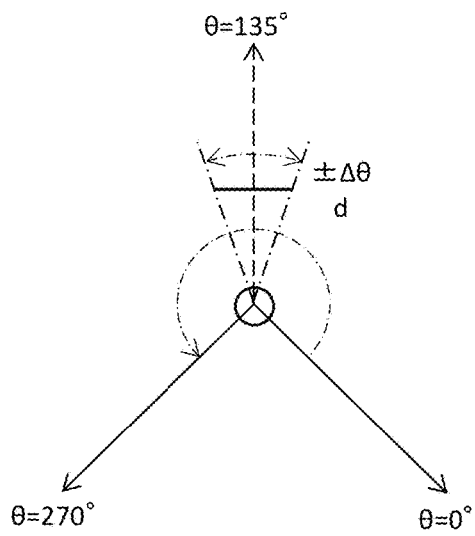
FIGS. 9A, 9B, and 9C are diagrams each illustrating an interrelationship between a distance and a scanning angle range.
Figure 9A:
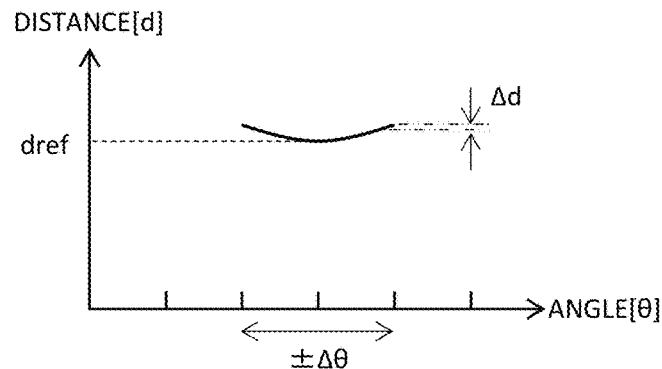

As illustrated in FIG. 9A, in a case where the distance d calculated at a scanning angle θ by the distance calculation unit 81 and distances calculated at scanning angles θ±Δθp (Δθp=0.25 degrees) adjacent to the scanning angle θ are each equal to or less than a predetermined threshold value Δd, objects corresponding to the distance d are determined as an identical object.

When a scanning angle range±Δθ corresponding to a size of an object along a scanning direction corresponds to a reference scanning angle range $\theta_{ref}$ of a capture target, which is set based on a reference distance $d_{ref}$ representing the distances d within the scanning angle range±Δθ, the detected object can be identified as the capture target.

That is, in a case where the reflecting sheet 40 lies at a position away at the reference distance $d_{ref}$ from the object capturing device 20, a scanning angle corresponding to a lateral direction length of 300 mm of the reflecting sheet 40, which corresponds to a scanning direction size, is determined as the reference scanning angle range $\theta_{ref}$.

Figure 9B:
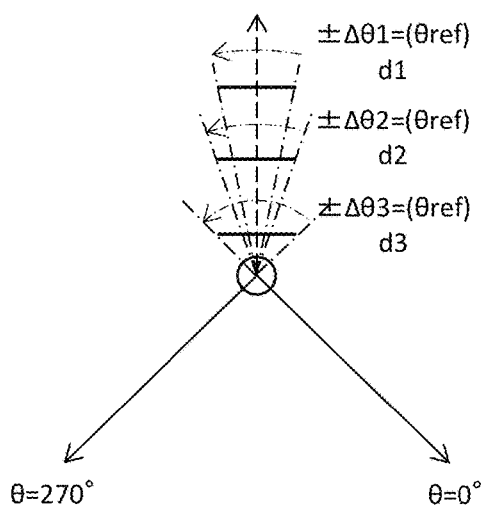
Figure 9B:
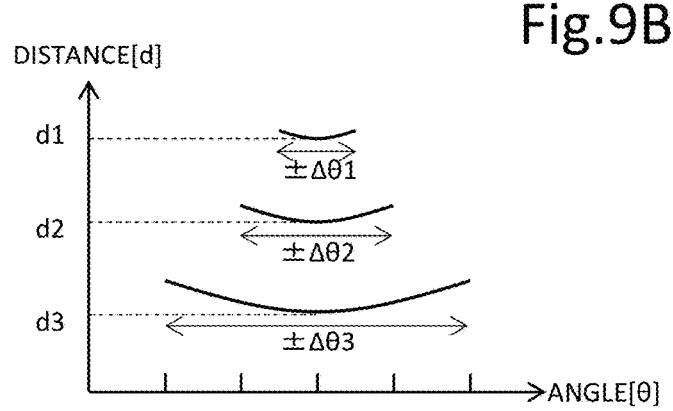

Therefore, as illustrated in FIG. 9B, the reference scanning angle range $\theta_{ref}$ can be determined with a function described below, which uses the reference distance $d_{ref}$ as a variable.

$$\theta_{ref}=2 \cdot \tan^{-1}(W/2 \cdot d_{ref})$$

Where, W is a lateral width of the reflecting sheet 40 along a scanning direction of measurement light. In the present embodiment, as described above, as the reference distance $d_{ref}$, an average value of distances from the object capturing device 20 to an object is used.

Figure 10A:
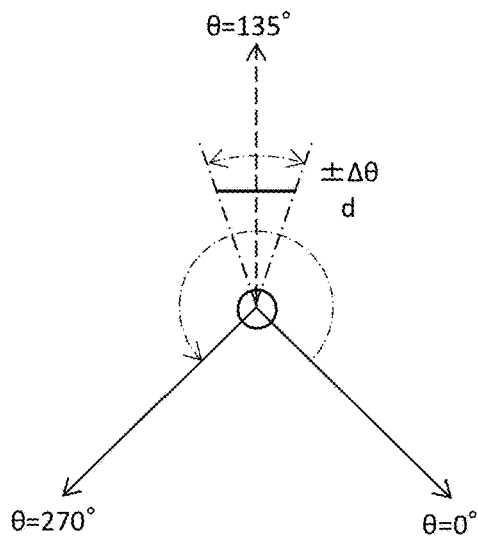
FIGS. 10A, 10B, and 10C are diagrams each illustrating an interrelationship between a distance and intensity distribution of reflected light.
Figure 10A:
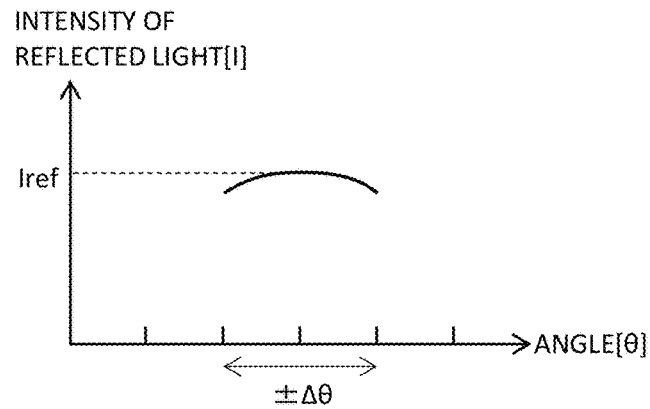

Furthermore, as illustrated in FIG. 10A, when intensity distribution I of reflected light detected within the scanning angle range±Δθ corresponding to a size of the object along the scanning direction corresponds to reference intensity distribution $I_{ref}$ of reflected light from a capture target, the detected object can be identified as the capture target. That is, as long as a size in a scanning direction of a capture target and intensity distribution of reflected light are set differently from a size in a scanning direction of another object and intensity distribution of reflected light, the capture target can be surely identified.

Figure 10B:
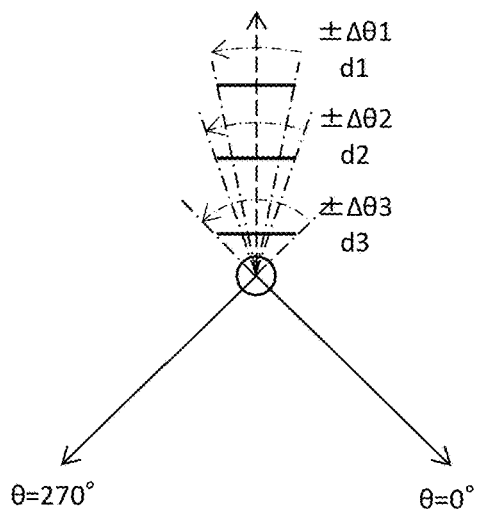
Figure 10B:
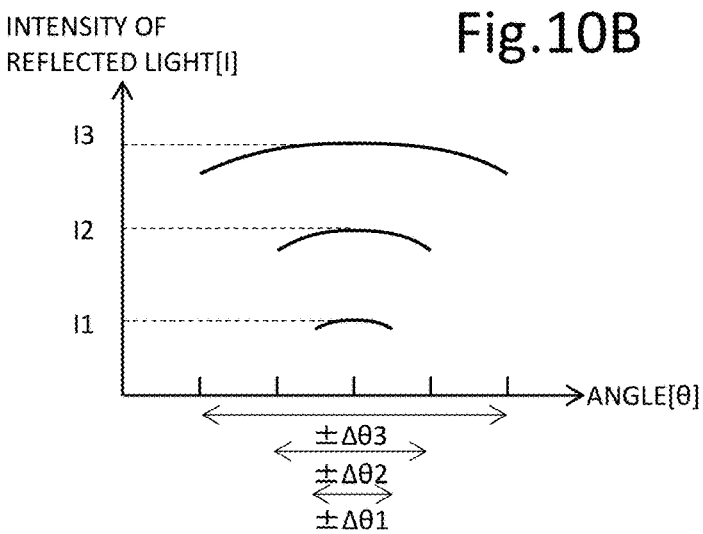

As illustrated in FIG. 10B, the reference intensity distribution $I_{ref}$ can be obtained with a function that uses as a variable the distance d from the object capturing device 20 to the reflecting sheet 40. The distance d and the intensity I of reflected light are normally inversely proportional to a square of the distance d. That is, when the distance d to the reflecting sheet 40 reduces, the intensity I of reflected light increases. When the distance d to the reflecting sheet 40 increases, the intensity I of reflected light reduces. That is, reference intensity distribution can be determined based on a distance to an object.

It is preferable that the reference scanning angle range $\theta_{ref}$ and the reference intensity distribution $I_{ref}$ described above be determined based on a degree of deviation in a scanning angle range with respect to a reference scanning position of measurement light.

When a capture target lying within a scanning range of measurement light changes in angle, a scanning direction size of the capture target and intensity distribution of reflected light change even when reference distances are equal. Even in such a case, by using, as an index, a degree of deviation in a scanning angle range with respect to a reference scanning position of measurement light to determine a reference scanning angle range and reference intensity distribution, a capture target can be further surely identified.

As a reference scanning position of measurement light, a scanning starting point angle (a position where θ=0 degrees in FIG. 9A), a scanning ending point angle (a position where θ=270 degrees in FIG. 9A), or a scanning angle at a center of a scanning range (a position where θ=135 degrees in FIG. 9A), for example may be arbitrarily selected. A degree of deviation in scanning angle range may be represented by an angular difference between the reference scanning position described above and an angle arbitrarily selected from among a starting point angle of a scanning angle range (a position where θ=135 degrees−Δθ in FIG. 9A), an ending point angle (a position where θ=135 degrees+Δθ in FIG. 9A), or a central angle (a position where θ=135 degrees in FIG. 9A), for example. Based on a function that uses the angular difference as a variable, the reference scanning angle range $\theta_{ref}$ and the reference intensity distribution $I_{ref}$ may be respectively determined.

Furthermore, it is preferable that the reference scanning angle range $\theta_{ref}$ and the reference intensity distribution $I_{ref}$ be determined based on an inclination angle of a capture target (reflecting sheet 40) with respect to the optical axis of measurement light, which is determined based on distances within a scanning angle range.

Depending on an inclination angle of a capture target (reflecting sheet 40) with respect to the optical axis of measurement light, even when the reference distances $d_{ref}$ are equal, a scanning direction size of the capture target and intensity distribution of reflected light change. Even in such a case, based on distances within a scanning angle range, an inclination of a capture target (reflecting sheet 40) with respect to the optical axis of measurement light is obtained. Based on the obtained inclination angle of the capture target (reflecting sheet 40) to determine the reference scanning angle range $\theta_{ref}$ and the reference intensity distribution $I_{ref}$, the capture target can be further surely identified.

Figure 9C:
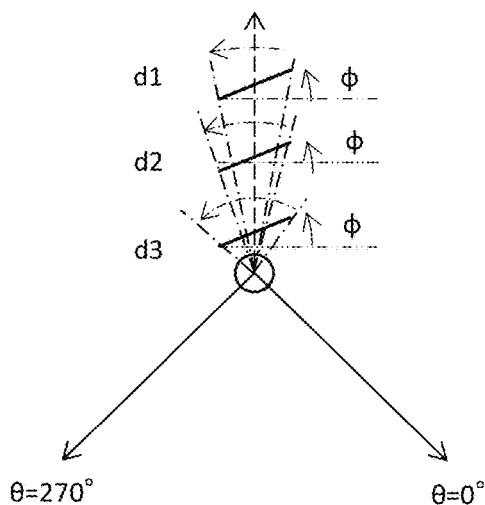
Figure 9C:
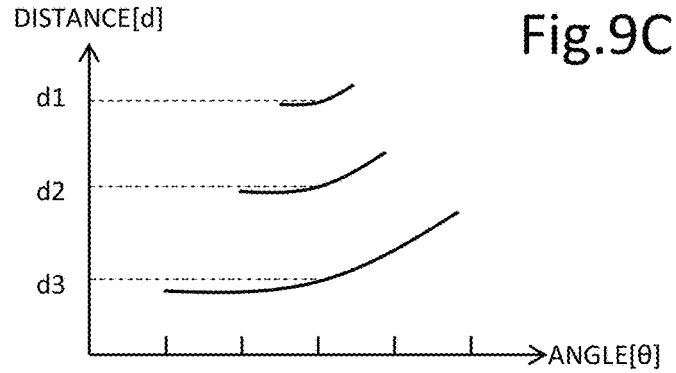

FIG. 9C illustrates distances within a scanning angle range, which are each obtained in a case where a reflection surface of a capture target is inclined at an angle φ with respect to the optical axis of measurement light. The inclination angle φ can be geometrically obtained based on distances to both ends along a scanning direction of a reflection surface present within a scanning angle range of a capture target. Average values of the distances within the scanning angle range can be calculated as reference distances d1, d2, and d3. By using, for example, a mathematical expression described below, a function that uses as variables the obtained reference distance $d_{ref}$ and the obtained inclination angle φ, the scanning angle range $\theta_{ref}$ can be obtained.

$$\theta_{ref}=2\cdot\tan^{-1}(W\cdot\cos\theta/4\cdot d_{ref})$$

Figure 10C:
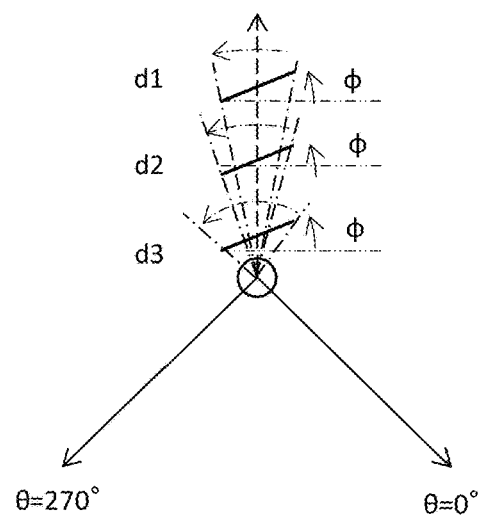
Figure 10C:
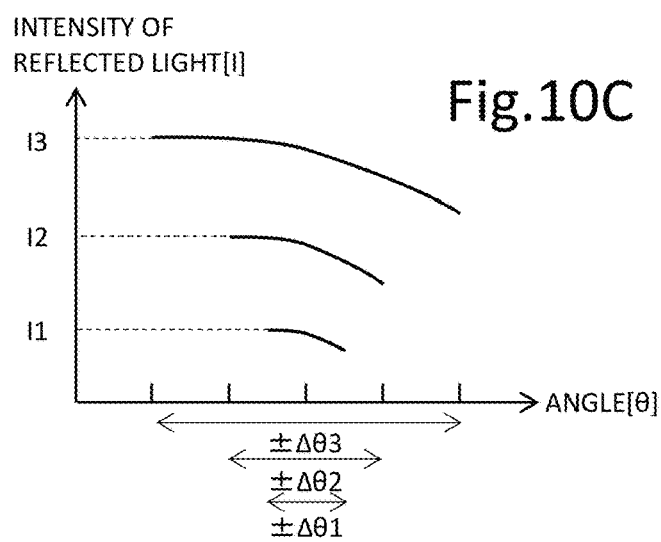

FIG. 10C illustrates various kinds of intensity I of reflected light within a scanning angle range, which are each obtained in a case where a reflection surface of a capture target is inclined at an angle φ with respect to the optical axis of measurement light. Similar to FIG. 9C, by using the function that uses as variables the obtained reference distance $d_{ref}$ and the obtained inclination angle φ, the reference intensity distribution $\theta_{ref}$ can be obtained.

The reference scanning angle range $\theta_{ref}$ and the reference intensity distribution $I_{ref}$ described above may be calculated by causing the object determination unit 82 to perform an arithmetic operation with the function described above. The reference distance $d_{ref}$ and the inclination angle φ may be each divided into a plurality of segments. The reference scanning angle range $\theta_{ref}$ and the reference intensity distribution $I_{ref}$ corresponding to each of the segments may be stored in a memory as reference data.

Figure 11A:
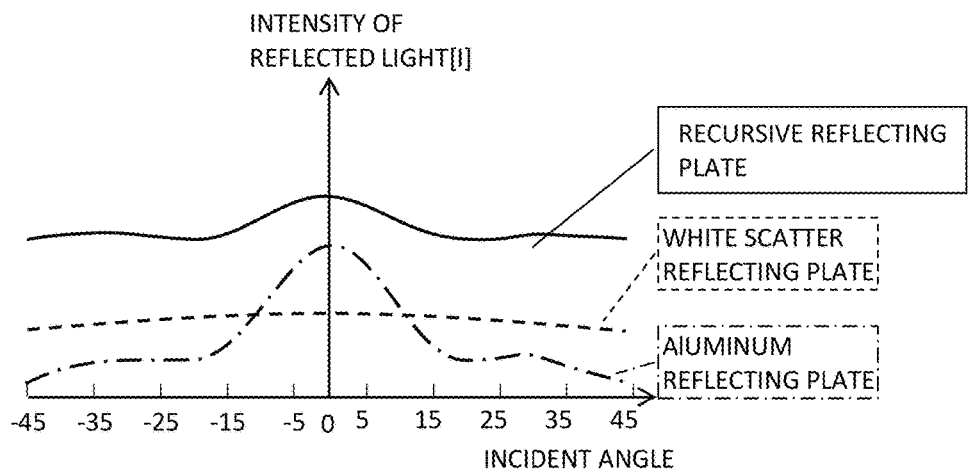
FIGS. 11A, 11B, and 11C are diagrams each illustrating an interrelationship between reflection properties of a reflecting sheet and intensity distribution of reflected light.

FIG. 11A illustrates an example where the reference intensity distribution $I_{ref}$ differs depending on reflection properties of the reflecting sheet 40 within a scanning angle range of an incident angle of 0 degrees (vertical incident)±45 degrees. In a case where the reflecting sheet 40 is a scatterer, such as white paper, intensity distribution of reflected light detected by the light receiving unit 22 presents substantially flat properties even when a scanning angle of measurement light changes.

On the other hand, since, in a case where the reflecting sheet 40 is made from a metal plate made of aluminum, for example, and has a mirror surface, measurement light is reflected by the mirror surface, when the measurement light is incident on the metal plate in a substantially vertical direction, intensity of reflected light detected by the light receiving unit 22 becomes greater. Meanwhile, when an incident angle of the measurement light shifts from the vertical direction, the intensity of reflected light extremely reduces. The intensity distribution of reflected light presents such properties that a peak is observed at a central part, at which the measurement light becomes vertical incident, whereas the intensity gradually lowers around the peak.

In a case where, as the reflecting sheet 40, a recursive reflecting member is adopted, such intensity distribution can be achieved that, similar to reflected light from a scatterer, such as white paper, intensity is greater enough and expands in a flat shape in a whole region. As a recursive reflecting member, for example, such a reflecting sheet is preferably used that is arranged with a trihedron cube corner element.

Figure 11B:
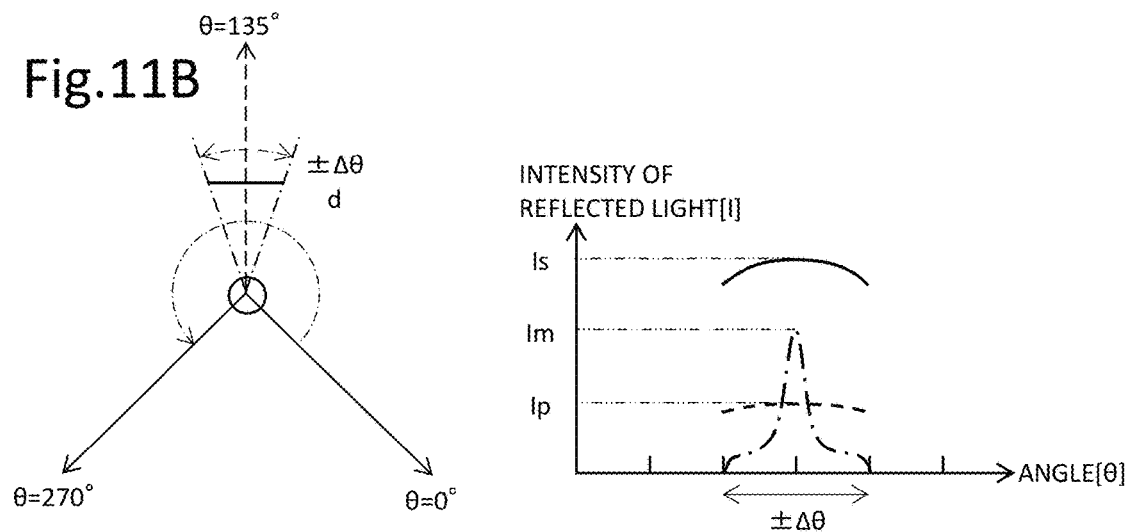

FIG. 11B illustrates intensity distribution of reflected light from a reflecting sheet disposed in a posture substantially vertical to the optical axis of measurement light when a scanning angle is 135 degrees. In a case where, even when the distance d is constant, a reflection surface of a reflecting sheet is a scatter surface, such intensity Ip of reflected light is observed that transitions in a relatively flat shape. In a case where a reflection surface of a reflecting sheet is a mirror surface, such intensity Im of reflected light is observed that is extremely greater at a central part at which the light becomes vertical incident, and that is smaller around both sides. In a case where a reflection surface of a reflecting sheet is a recursive reflecting member, such intensity Is of reflected light is observed that transitions in a relatively flat shape and is greater than the two kinds of the intensity described above.

Figure 11C:
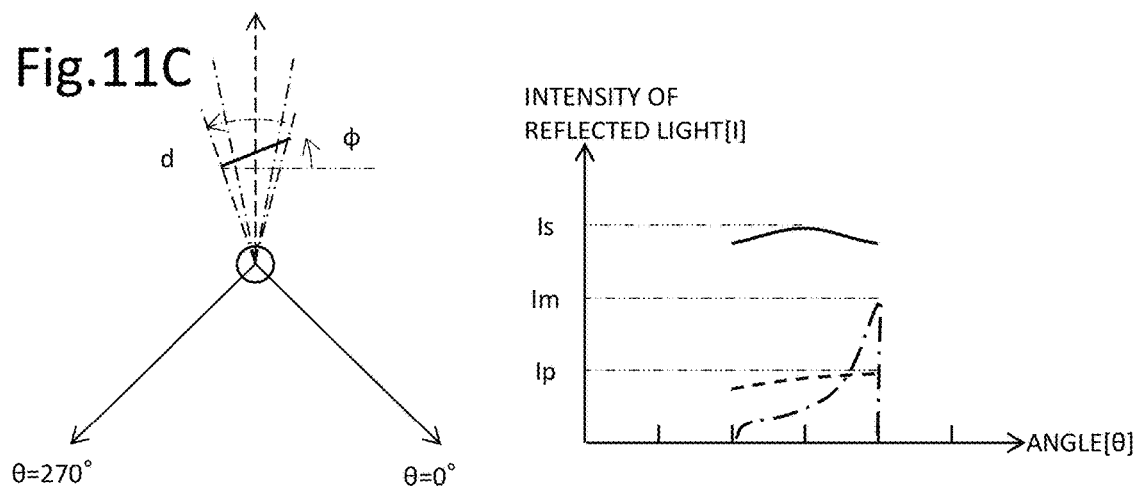

FIG. 11C illustrates intensity distribution of reflected light from a reflecting sheet slightly inclined from a posture vertical to the optical axis of measurement light. In a case where a reflection surface of a reflecting sheet is a scatter surface, and the reflection surface is made from a recursive reflecting member, intensity distribution rarely changes, compared with FIG. 11B. However, in a case where a reflection surface is a mirror surface, intensity distribution greatly changes depending on an incident angle.

Therefore, by adopting the reflecting sheet 40 having reflection properties different from reflection properties of an object that may lead to an erroneous detection, a capture target can be properly determined. In addition, by determining whether a capture target is present based on the reference scanning angle range $\theta_{ref}$ and the reference intensity distribution $I_{ref}$ that are reflected with the property of the reflecting sheet 40, the capture target can be appropriately captured even when the capture target takes any posture within a scanning range of measurement light.

Figure 12:
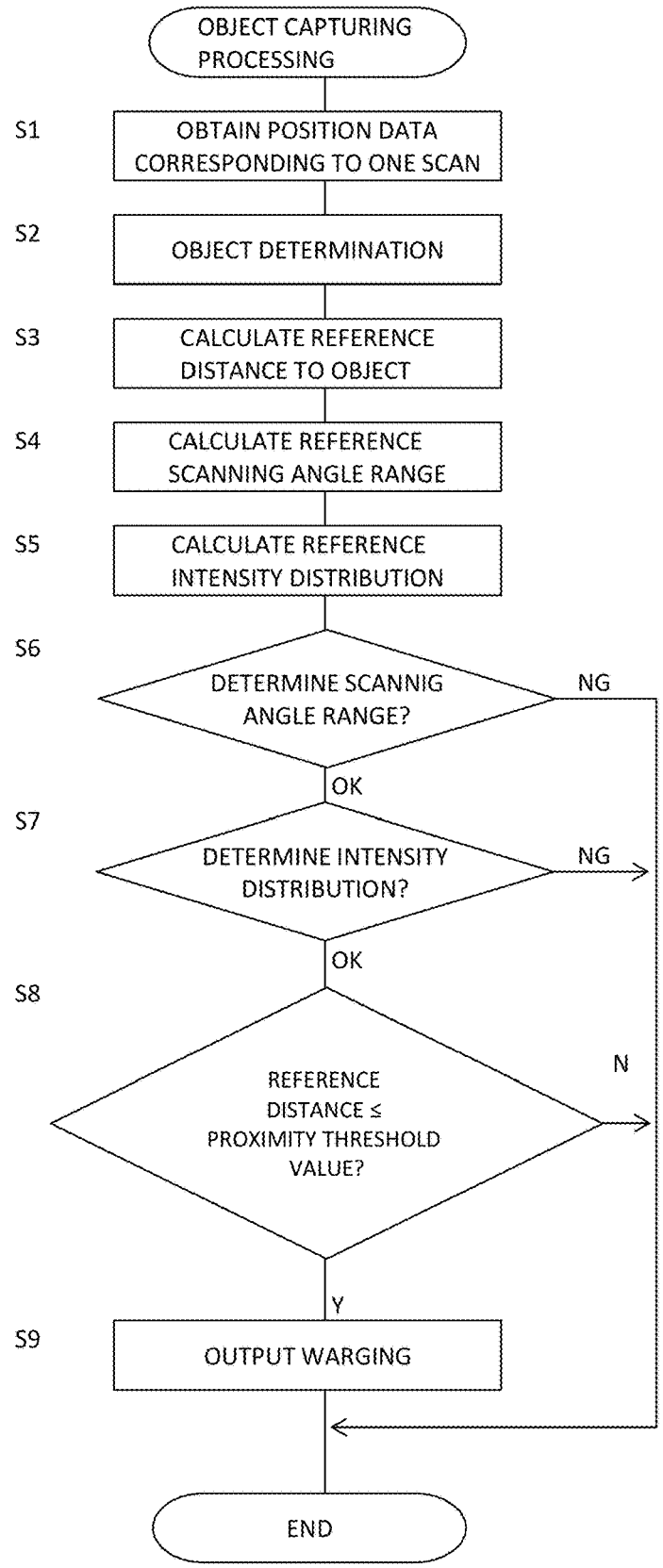
FIG. 12 is a flowchart illustrating an operation of an object determination unit.

FIG. 12 illustrates a flow of an object capturing procedure executed by the object determination unit 82.

The object determination unit 82 obtains pieces of position data and corresponding scanning angles which are calculated by the distance calculation unit 81 per one scan of measurement light and corrected by the correction calculation unit 83 (S1). Then the object determination unit 82 performs object determination processing configured to recognize an object from which the position data is obtained as a candidate of a capture target, when a continuous scanning angle range, within which a difference between a scanning angle and each of distances at scanning angles adjacent to the scanning angle is determined to be equal to or less than a predetermined threshold value, is equal to or more than a predetermined threshold value, based on the plurality of position data (S2)

Per an object being extracted, a reference distance is calculated (S3). The function described above is used to calculate a reference scanning angle range (S4). The function described above is used as well to calculate reference intensity distribution (S5). Such a configuration may be applied that a reference scanning angle range and reference intensity distribution are determined beforehand in accordance with a reference distance and a degree of deviation from a scanning angle corresponding to the reference distance, i.e., a degree of deviation from a reference scanning angle, and that data stored in a memory is read.

A difference between a scanning angle range and the reference scanning angle range of each object is obtained. When the difference is equal to or less than a predetermined threshold value, it is determined that the object is likely to be the capture target. When the difference is more than the predetermined threshold value, it is determined that the object is not the capture target (S6, OK).

Next, for the object determined in step S6 that the object is likely to be the capture target, a difference between intensity distribution of reflected light and the reference intensity distribution is obtained. When the difference is equal to or less than a predetermined threshold value, it is determined that the object is the capture target (S7, OK).

When the reference distance to the object that is determined as the capture target is equal to or less than a predetermined proximity threshold value (S8, Y), a deceleration or stop warning signal is output to the traveling control unit 70 (see FIG. 8). Such a configuration may be applied that two stages, i.e., greater and smaller, of proximity threshold values are set. In this case, when a value equal to or less than the greater threshold value is determined, a deceleration warning signal may be output. Meanwhile, when a value equal to or less than the smaller threshold value is determined, a stop warning signal may be output.

When, in step S8, the reference distance of the capture target is greater than the predetermined proximity threshold value, and a deceleration or stop warning signal has been output in the past, the signal is cancelled. Steps S1 to S9 described above are repeated per unit scan of measurement light.

[Object Capturing Device According to Second Embodiment]

In the object capturing device 20 described above, the light emission unit 21 includes the infrared laser diode. However, the wavelength is not particularly limited. The light emission unit may include a plurality of light sources respectively configured to emit light at wavelengths different from each other. The reference intensity distribution $I_{ref}$ described above may be respectively determined by the wavelengths of the light sources. A number of the light sources and wavelengths of light emitted from the light sources are not particularly limited, but may be appropriately set. The reference scanning angle range $\theta_{ref}$ may be appropriately set as well.

For example, in a case where the light emission unit includes two light sources, such as a red laser diode chip and a green laser diode chip, and reference intensity distribution is set per each of wavelengths of the light sources in accordance with spectral reflection properties of a reflecting sheet serving as a reflection surface of a capture target, which differ from spectral reflection properties of a surface of an object other than the reflection surface of the capture target, the capture target can be further surely identified.

For example, spectral reflection properties of a reflecting sheet may be set to allow two kinds of reference intensity distribution with respect to red and green to be identical in properties to each other. Otherwise, spectral reflection properties of a reflecting sheet may be set to allow two kinds of reference intensity distribution with respect to red and green to differ in properties from each other. Along a scanning direction of measurement light, kinds of spectral reflection properties with respect to red and green may be set to differ from each other in a continuous manner or in a stepwise manner.

In this case, the light emission control unit 84 (see FIG. 8) may alternately switch and drive the two light sources during a scanning period of the light scanning unit 23. In a case where a moving speed of a capture target is fully slower than a speed corresponding to a scanning period of the light scanning unit 23, the light sources can be switched and driven per scanning period.

Instead of a configuration where the light emission unit 21 of the object capturing device 20 includes a plurality of light sources respectively configured to emit light at wavelength different from each other, a plurality of the object capturing devices 20 each including a light emission unit including a light source may be prepared, and the light sources of the light emission units of the object capturing devices 20 may be respectively configured to emit light at wavelengths different from each other.

Figure 14:
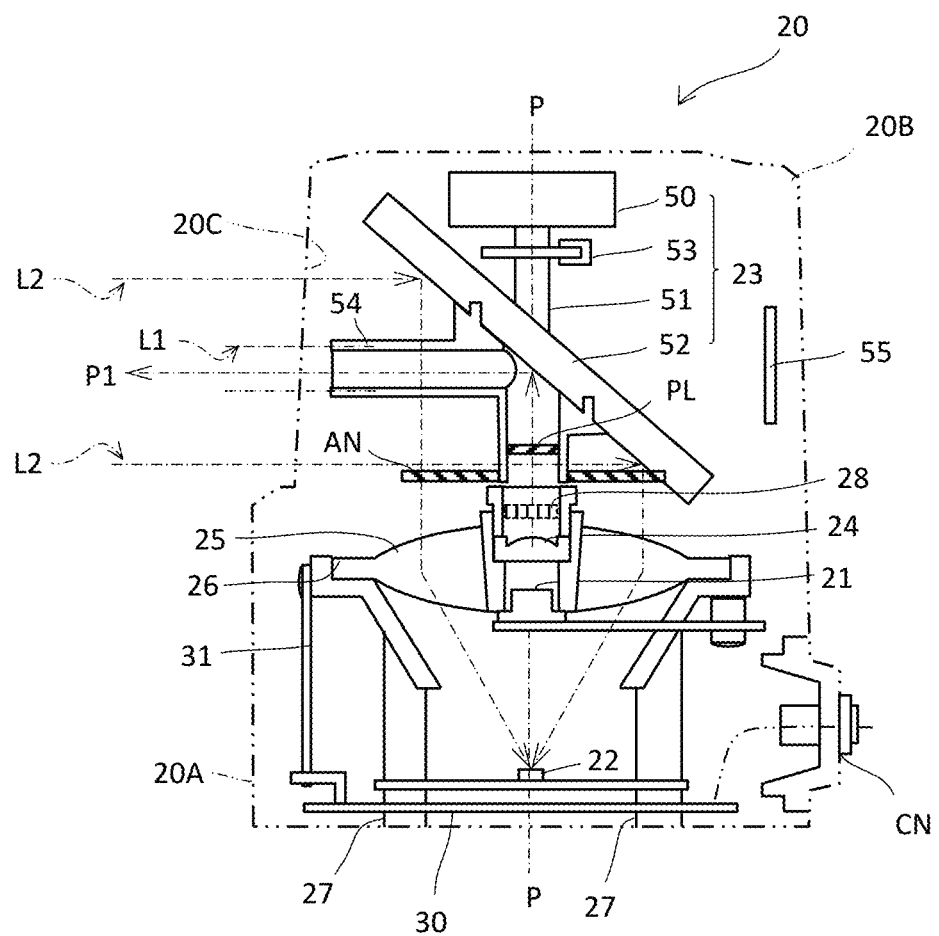
FIG. 14 is a diagram illustrating an internal structure of an object capturing device according to still another embodiment.

FIG. 14 illustrates another example of the light scanning unit 23 of the object capturing device 20. In the light guide unit 54 assembled in the light scanning unit 23, at positions facing the light emission unit 21, the polarizer PL described above is disposed at an inlet end of the measurement light optical path L. Meanwhile, the analyzer AN described above is disposed at an outlet end of the reflected light optical path L2 for reflected light polarized by the deflecting mirror 52 to achieve integral rotation with the deflecting mirror 52.

In a case where the configuration in FIG. 7 is adopted, weights of the polarizer PL and the analyzer AN slightly increase torque about the rotating shaft 51, increasing power of the motor 50. However, stable rotation of the light scanning unit 23 can be achieved. Even when the configuration in FIG. 14 is adopted, an increase in power of the motor 50 is not so greater than an increase in power achieved in the configuration in FIG. 7.

Figure 15:
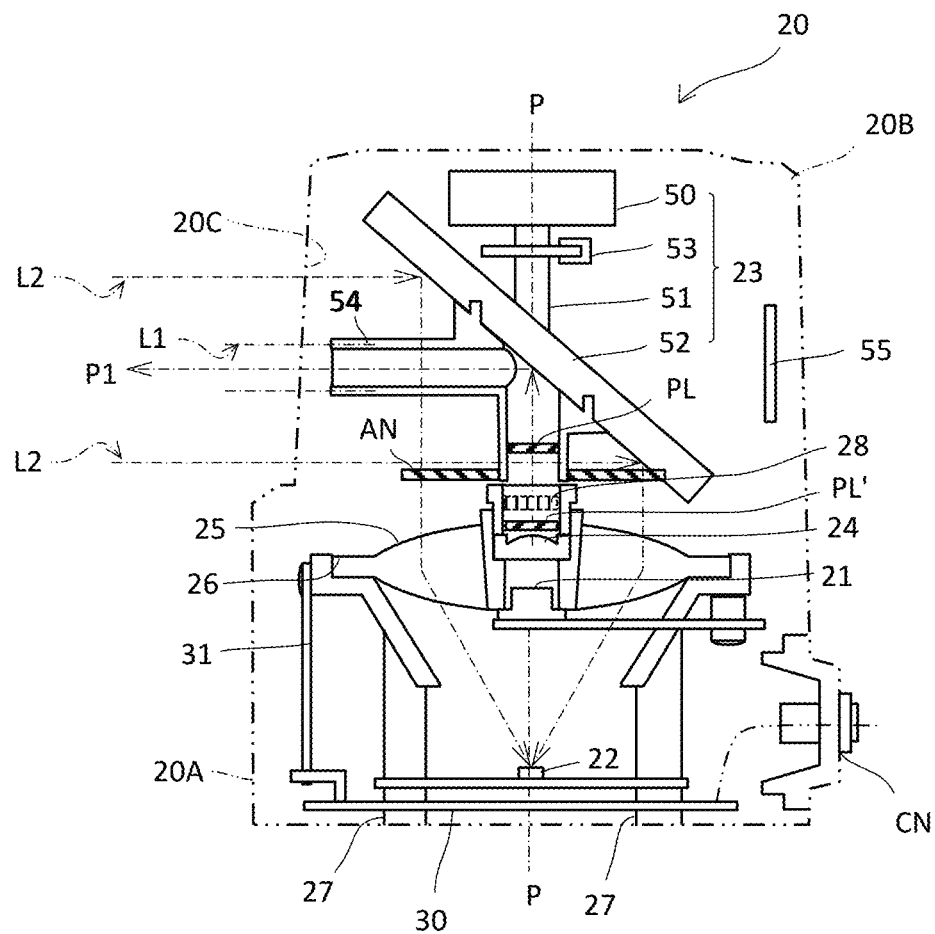
FIG. 15 is a diagram illustrating an internal structure of an object capturing device according to still another embodiment.

FIG. 15 illustrates another example including the light scanning unit 23 of the object capturing device 20. In each of the examples in FIGS. 7 and 14, in the light emission direction, the ¼ wavelength plate 28 is disposed at a position immediately behind the light projection lens 24. However, in the example in FIG. 15, a polarizer PL' for linear polarization is further disposed between the light emission unit 21 and the ¼ wavelength plate 28. The polarizer PL serves as a first polarizer. The polarizer PL' serves as a second polarizer.

By adjusting the polarizer PL' to allow a polarization surface to receive incident light at a bearing angle of 45 degrees relative to a fast axis (or slow axis) of the ¼ wavelength plate 28, linearly polarized light can turn into circularly polarized light forming a substantially perfect circle. As a result, with the polarizer PL provided in the light scanning unit 23, measurement light appropriately linearly polarized can be obtained.

In a case where the polarizer PL' is not provided, but such a lens that is made of a resin having greater birefringence, such as polycarbonate, is used as the light projection lens 24, a polarization state of measurement light emitted from the laser diode constituting the light emission unit 21 changes. In this case, measurement light passing through the ¼ wavelength plate 28 turns into circularly polarized light having an almost ellipse shape. Measurement light passed through the polarizer PL then turns into elliptically polarized light. As a result, accuracy in detecting reflected light may lower. However, with the polarizer PL', measurement light emitted from the laser diode can be surely linearly polarized and guided to the ¼ wavelength plate 28. As well as measurement light passed through the polarizer PL can be appropriately linearly polarized. Therefore, accuracy in detecting reflected light can be increased.

Figure 16:
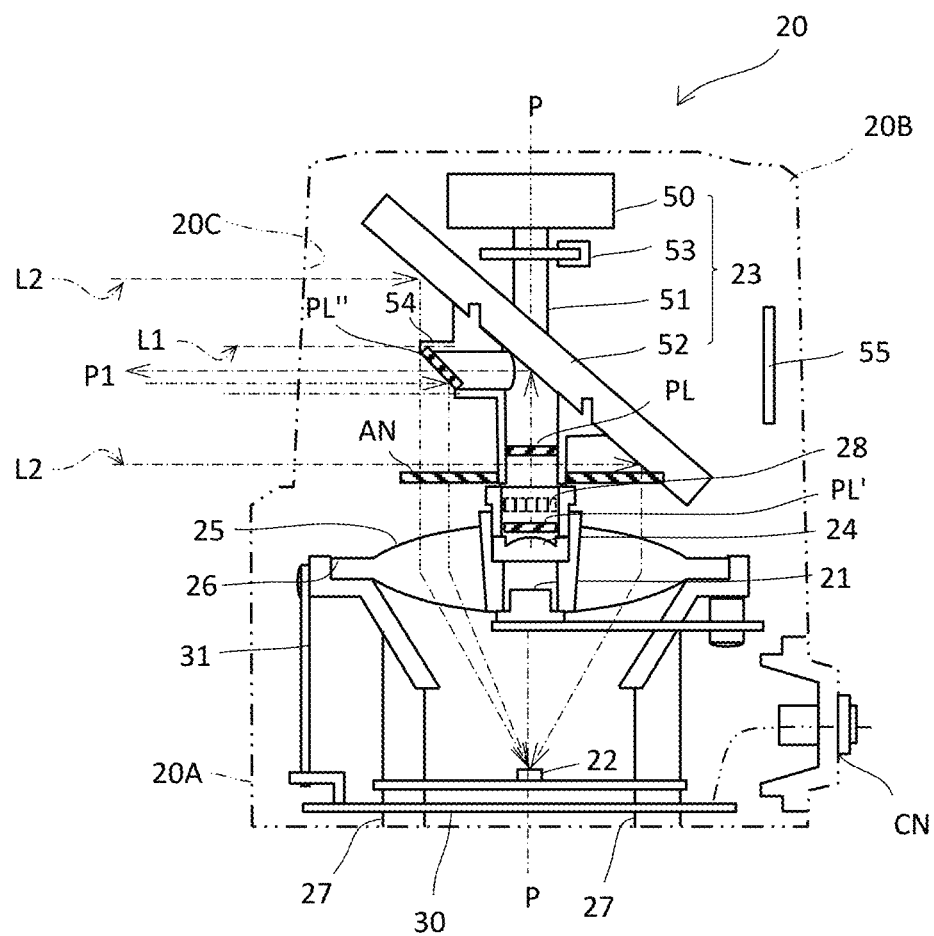
FIG. 16 is a diagram illustrating an internal structure of an object capturing device according to still another embodiment.

FIG. 16 illustrates another example including the light scanning unit 23 of the object capturing device 20. On an outlet side of the light guide unit 54 assembled in the light scanning unit 23, a polarizer PL" having polarization properties identical in direction to the polarization properties of the polarizer PL is disposed identically in inclined posture to the deflecting mirror 52.

In a case where the polarizer PL" is not provided, and an object to be irradiated with measurement light lies adjacent to the object capturing device 20, a diameter of a measurement light beam emitted from the light guide unit 54 reduces. As well as a degree of expansion of a reflected light beam from the object reduces. As a result, a diameter of reflected light advancing in the reflected light optical path L2 becomes closer to a diameter of the measurement light optical path L1. As well as, a quantity of light guided to the light receiving unit 22 reduces. In this case, such a situation may occur that a distance is not precisely detected.

Even in such a case, by providing the polarizer PL", in reflected light from the object, linearly polarized light perpendicular to linearly polarized light of measurement light is reflected by the polarizer PL", and is guided to the light receiving unit 22.

Therefore, when the object is a capture target, linearly polarized light perpendicular to linearly polarized light of measurement light is guided to the light receiving unit 22, increasing detection accuracy. When the object is not the capture target, reflected light of linearly polarized light identical to linearly polarized light of measurement light can pass through the polarizer PL". Therefore, a quantity of reflected light to be guided to the light receiving unit 22 reduces, making it possible to avoid erroneous detection. That is, the polarizer PL" functions as a half mirror configured to guide, to the light receiving unit 22, reflected light that is incident on the light guide unit 54. As long as such a condition is satisfied that reflected light is guided to the light receiving unit 22, the polarizer PL" can be provided as required in the measurement light optical path L1. In some cases, an ordinary half mirror can be used.

[Filtering Processing of Identifying Capture Target Based on Light Receiving Level of Reflected Light]

An improvement on an algorithm for identifying a capture target by the object determination unit 82 (see FIG. 8) will be described.

Figure 17A:
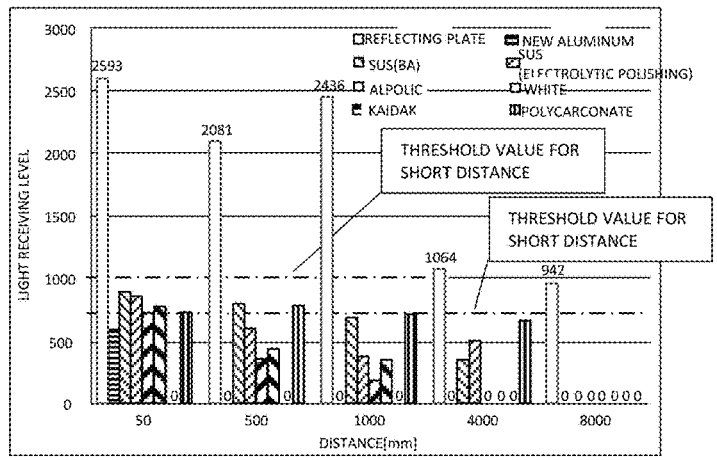
FIG. 17A is a diagram of properties of detecting reflected light with respect to a plurality of reflecting members.

FIG. 17A illustrates, in a case where the object capturing device 20 having the configuration illustrated in FIG. 16 is used, distances with respect to various reflecting members and properties of detecting a light receiving level of reflected light. FIG. 18 illustrates materials of the reflecting members illustrated in FIG. 17A. The "reflecting plate" illustrated in FIG. 18 is applied to a capture target to serve as a reflecting plate made from an optical member described above (e.g., a reflecting plate using a trihedron cube corner element).

In a case where a distance ranges from 50 mm to 1000 mm inclusive, a light receiving level by the reflecting plate described above is greater enough than that of other reflecting members. In a case where a distance exceeds 1000 mm, a light receiving level by the reflecting plate greatly lowers, but is still a greater value, compared with the other reflecting members.

Therefore, by setting, for a light receiving level of reflected light, a threshold value in accordance with a distance, a true capture target can be determined when reflected light is received at a level exceeding a threshold value. That is, by setting different threshold values for levels of receiving reflected light in accordance with detection distances, a capture target and other objects can be identified.

Specifically, a threshold value for a light receiving level of reflected light at a shorter distance may be set greater than a threshold value for a light receiving level of reflected light at a longer distance. In the example described above, a boundary distance between the shorter distance and the longer distance is approximately 1000 mm. At a short distance equal to or shorter than 1000 mm, a threshold value of 1000 is set. At a long distance longer than 1000 mm, a threshold value of 700 is set.

The value of the boundary between the short distance and the long distance can be set to an appropriate value as required in accordance with a specific configuration of the object capturing device 20, such as a quantity of light emitted from a light source, sensitivity of a light-receiving element, and a configuration of an optical system. Such a configuration can be applied that threshold values are switched in a multi-stepwise manner. For example, different threshold values are respectively set at boundaries among a short distance, a medium distance, and a long distance.

Setting of switching threshold values for levels of receiving reflected light based on a detection distance to an object is effective in not only the object capturing device 20 configured as illustrated in FIG. 16, but also the object capturing device 20 configured as illustrated in FIGS. 7, 14, and 15.

Figure 17B:
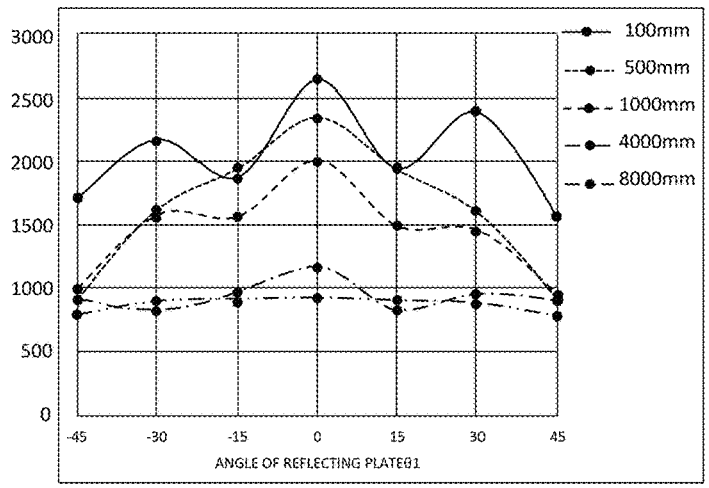
FIG. 17B is a diagram of properties of detecting reflected light with respect to a change in angle of a reflecting plate.

FIG. 17B illustrates properties of detecting reflected light in a case where an angle θ1 between the optical axis of measurement light and a normal line to the reflecting plate is altered within a range of 0 degrees±45 degrees. Such a tendency is illustrated that, when the angle θ1 is 0 degrees, the light receiving level becomes maximum, whereas, when the angle θ1 is around ±45 degrees, the light receiving level becomes minimum. When the angle θ1 is around ±45 degrees, the light receiving level is equal to or less than the threshold value for short distance of 1000. In this case, no detection may be possible when the angle θ1 of the reflecting plate is around 45 degrees.

Figure 17C:
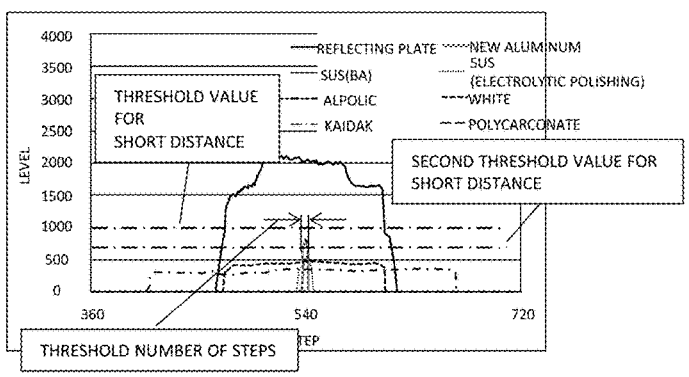
FIG. 17C is diagram of properties of detecting reflected light with respect to a scanning direction.

FIG. 17C illustrates a light receiving level of reflected light along a scanning direction in a case where the angle θ1 is set to 0 degrees with respect to various reflecting members. In FIG. 17C, STEP 540 represents a light receiving level in a case where a scanning direction of measurement light aligns with a normal line direction to a reflecting member. A distance between the reflecting member and the object capturing device 20 is 500 mm. When the threshold value for the light receiving level is set to 1000, the reflecting plate and other reflecting members can be explicitly identified.

Figure 17D:
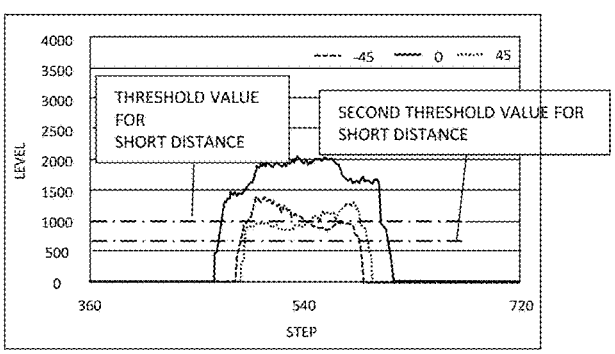
FIG. 17D is a diagram of properties of detecting reflected light with respect to a scanning direction in a case where an angle of a reflecting plate is changed.

FIG. 17D illustrates light receiving levels of reflected light along a scanning direction in a case where the angle θ1 with respect to the reflecting plate is set to 0 degrees, −45 degrees, and +45 degrees. A distance between the reflecting plate and the object capturing device 20 is 500 mm. Similar to FIG. 17B, by setting a threshold value for the light receiving level to a threshold value for short distance of 1000, no detection may be possible when the angle θ1 is around ±45 degrees. Even in such a case, by providing a second threshold value for short distance at a level lower than a level of the threshold value for short distance, and setting the value to 700, for example, a secure detection becomes possible even when the angle θ1 is around ±45 degrees.

However, when the second threshold value for short distance is set to 700, as illustrated in FIG. 17A, and when the angle θ1 is around 0 degrees, a mirror reflecting member, such as an aluminum plate or an SUS plate, may be erroneously detected as a reflecting plate of a capture target.

Even in such a case, by taking into account a number of steps of continuously detecting reflected light relative to a scanning direction of measurement light, reflected light from the mirror reflecting member and reflected light from the reflecting plate (e.g., reflecting plate using a trihedron cube corner element) can be identified.

For example, as illustrated in FIG. 17C, by setting a threshold number of steps greater than a number of steps of continuously detecting reflected light from the mirror reflecting member, which is detected when the angle θ1 is 0 degrees and the second threshold value for short distance is 700, when a light receiving level of reflected light is continuously observed at values equal to or more than the second threshold value for short distance of 700 in a number of steps equal to or more than the threshold number of steps, a capture target having the reflecting plate can be identified.

For example, in a case where a detection distance is a short distance, under either of a condition that a light receiving level of reflected light is equal to or more than a threshold value for short distance or a condition that a light receiving level of reflected light is continuously observed at values equal to or more than a second threshold value for short distance in a number of steps equal to or more than a threshold number of steps, a capture target can be identified.

In a case where a detection distance is a long distance, by separately providing a second threshold value for long distance at a level smaller than a level of a threshold value for long distance, under either a condition that a light receiving level of reflected light is equal to or more than the threshold value for long distance or a condition that a light receiving level of reflected light is continuously observed at values equal to or more than the second threshold value for long distance in a number of steps equal to or more than the threshold number of steps, a capture target can be identified.

[Light Scanning Unit Assembled in Object Capturing Device According to Other Embodiments]

The object capturing device 20 illustrated in FIG. 7 and described above includes, as an example, the light scanning unit 23 including the motor 50 provided on the inner wall of the upper surface of the upper casing 20B and the deflecting mirror 52 fixed to the rotating shaft 51 of the motor 50 to be integrally rotatable with the rotating shaft 51. However, a configuration of a light scanning unit of an object capturing device, to which the present invention is applied, is not limited to the configuration described above. Another known configuration of a light scanning unit can be adopted.

For example, instead of the deflecting mirror described above, such a rotating polygon mirror may be used that rotates, about a longitudinal shaft center, a polygonal prism having side surfaces respectively formed into mirror surfaces to allow the light emission unit to emit measurement light to a measurement target space to perform scanning, as well as to guide reflected light to the light receiving unit.

Instead of the scanning mechanism that rotates the flat deflecting mirror, as described above, such a swing mechanism may be adopted that performs scanning in a swinging manner. Such a configuration may be adopted that a swing mechanism configured to allow a deflecting mirror rotated and driven by the light scanning unit 23 to swing about a shaft center intersecting with a rotating shaft center to perform scanning, as described above, is further provided to achieve three-dimensional scanning.

Even in any aspects, a light scanning unit may include a deflecting mirror and a light guide unit defining an optical path configured to guide measurement light polarized by the deflecting mirror to a measurement target space and an optical path configured to guide reflected light to a light receiving unit. Furthermore, a polarizer may be disposed on a measurement light optical path side of the light guide unit. Meanwhile, an analyzer may be disposed on a reflected light optical path side of the light guide unit.

With the configuration described above, the light guide unit defines regions of optical paths into the measurement light optical path and the reflected light optical path. When measurement light emitted from the light emission unit advances into the measurement light optical path, only linearly polarized light vibrating in the first direction passes through the polarizer to reach a measurement target space to achieve scanning. When reflected light from an object advances into the reflected light optical path, only linearly polarized light vibrating in the second direction perpendicular to the first direction passes through the analyzer. The reflected light is then received by the light receiving unit.

[Signal Processing of Reducing Effects of Interference Light from Other Object Capturing Devices]

When measurement light from other ones of the object capturing devices 20 present around one of the object capturing devices 20 is incident as interference light, the light may be erroneously detected as reflected light with respect to the measurement light emitted from the one of the object capturing devices 20. In a case where periods at which measurement light is emitted from two of the object capturing devices 20 are identical to each other, interference light is incident at an identical period, possibly leading to an erroneous detection.

With a configuration of the light emission control unit 84 (see FIG. 8), where average periods at which measurement light is emitted from the object capturing devices 20 are kept constant, but emission periods are shifted at random within a range of a T/2 periods around an average period T, such a phenomenon can be avoided that interference light is incident at an identical period.

It is preferable that the distance calculation unit 81 (see FIG. 8) be configured, in a case where a plurality of reflected lights are detected with respect to one pulse of measurement light emitted from each of the object capturing devices 20, to execute processing of dividing the period T of measurement light into a plurality of time domains, and of storing, in a memory, that a detected reflected light belongs to which of the time domains, on a predetermined, continuous number of measurement lights to adopt, as true reflected light, reflected light in one of the time domains, in which a number of detected reflected lights is maximum.

Similarly, the object determination unit 82 (see FIG. 8) may be configured, in a case where a plurality of reflected lights are detected with respect to one pulse of measurement light emitted from each of the object capturing devices 20, to cause the distance calculation unit 81 (see FIG. 8) to calculate a distance with respect to each of the reflected lights, and to execute processing of dividing the period T of measurement light into a plurality of time domains, and of storing, in a memory, that a detected distance belongs to which of the time domains, on a predetermined, continuous number of measurement lights to adopt, as a distance with respect to true reflected light, a distance observed from one of the time domains, in which a number of detected distances is maximum.

Furthermore, the distance calculation unit 81 (see FIG. 8) may be configured, in a case where a plurality of reflected lights are detected with respect to one pulse of measurement light emitted from each of the object capturing devices 20, to execute processing of dividing the period T of measurement light into a plurality of time domains, and to store, in a memory, that a detected reflected light belongs to which of the time domains, for a predetermined number of scanning periods to adopt, as a distance with respect to true reflected light, a distance observed from one of the time domains, in which a number of detected reflected lights is maximum.

Similarly, the object determination unit 82 (see FIG. 8) may be configured, in a case where a plurality of reflected lights are detected with respect to one pulse of measurement light emitted from each of the object capturing devices 20, to cause the distance calculation unit 81 (see FIG. 8) to calculate a distance with respect to each of the reflected lights, and to execute processing of dividing the period T of measurement light into a plurality of time domains, and of storing, in a memory, that a detected distance belongs to which of the time domains, for a predetermined number of scanning periods to adopt, as a distance with respect to true reflected light, a distance observed in one of the time domain, in which a number of detected distances is maximum.

[Reflection Surface of Capture Target]

It is preferable that a capture target to be captured by each of the object capturing devices 20 described above include the reflecting sheet 40 having reflection properties causing a quantity of reflected light along a scanning direction of measurement light used for scanning by the light scanning unit 23 to change in a stepwise manner.

By setting reflection properties of a reflection surface of a capture target to allow a quantity of reflected light along a scanning direction of measurement light used for scanning by the light scanning unit 23 to change in a stepwise manner or in a continuous manner, identification at higher accuracy from another object without having such properties can be achieved.

Figure 19A:
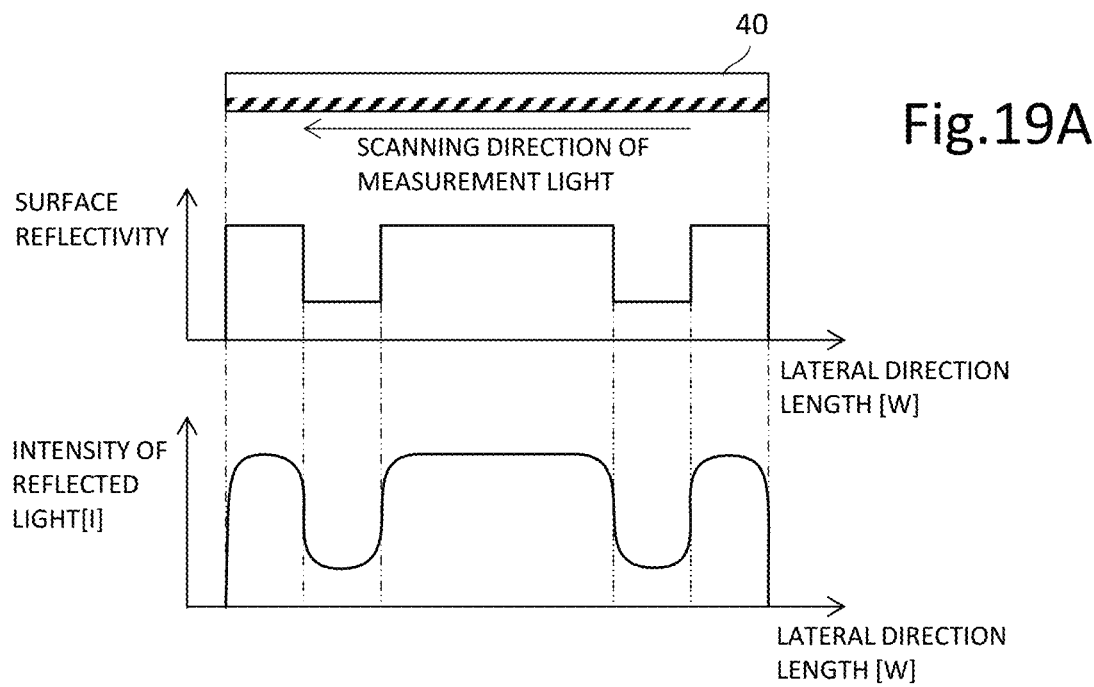
FIGS. 19A and 19B are diagrams each illustrating reflection properties of a reflecting sheet.

For example, as illustrated in FIG. 19A, with the reflecting sheet 40 set with surface reflectivity that is higher in areas at the both ends and the central part of the reflecting sheet 40, but that is lower in areas between the both ends and the central part along a scanning direction of measurement light, which causes a quantity of reflected light detected by the light receiving unit 22 along the scanning direction to change in a stepwise manner, reflected light from other objects can be surely identified.

Figure 19B:
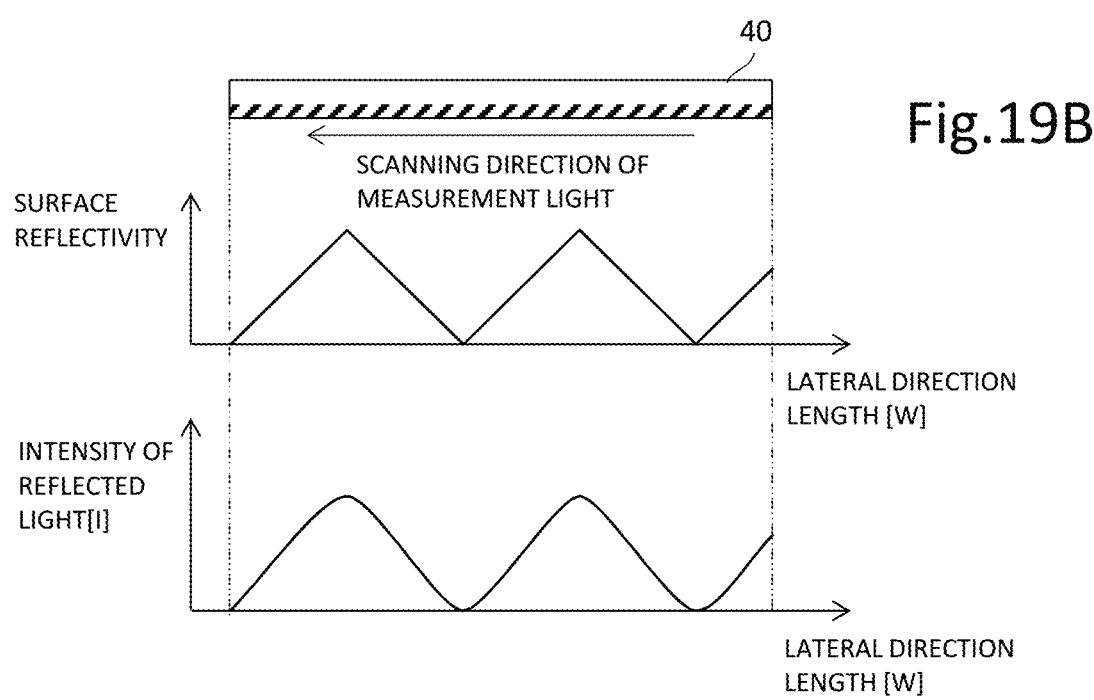

For example, as illustrated in FIG. 19B, with the reflecting sheet 40 set with surface reflectivity changing in a saw-tooth manner along a scanning direction of measurement light, which causes a quantity of reflected light detected by the light receiving unit 22 along the scanning direction to increase or decrease in a continuous manner, reflected light from other objects can be surely identified.

The reflecting sheet 40 having such reflection properties may be adopted that cause spectral reflection properties with respect to a wavelength of measurement light along a scanning direction of the measurement light to change in a stepwise manner or in a continuous manner. In a case where the light emission unit 21 includes a plurality of light sources configured to emit light at different wavelengths, it is preferable that such reflection properties be provided that spectral reflection properties change per the wavelength of each of the light sources.

In any case, it is preferable that, as the reflecting sheet 40, a recursive reflecting member, in particular, a recursive reflecting member arranged on its surface with a trihedron cube corner element, be used. In a case where such a recursive reflecting member is used, the reflecting mirrors 41, 42, and 43 (See FIG. 14A) can be each formed with an interference film at a predetermined thickness to adjust spectral reflection properties.

Instead of providing a recursive reflecting member in a whole area, the whole area of the reflecting sheet 40 may be divided into regions each provided with a recursive reflecting member and regions each not provided with a recursive reflecting member to cause a quantity of reflected light along a scanning direction of measurement light to change in a stepwise manner or in a continuous manner. For example, in a region without a recursive reflecting member, a scattering reflecting member or a light absorbing member may be provided.

By appropriately combining the object capturing device 20 and the reflecting sheet 40 provided to a capture target, according to the plurality of aspects described above, an object capturing system according to the present invention is achieved.

Any embodiments described above are merely examples of the present invention, and the scope of the present invention is not limited to this description. Specific configurations of the components can be changed as appropriate as long as the advantageous effects of the present invention can be provided.

DESCRIPTION OF SYMBOLS

1: manufacturing device
5: traveling rail
10: carrying cart
20: object capturing device
21: light emission unit
22: light receiving unit
23: light scanning unit
24: light projection lens
25: light receiving lens
40: reflecting sheet
54: light guide unit
70: traveling control unit
80: control unit
81: distance calculation unit
82: object determination unit
100: manufacturing facility
AN: analyzer
PL, PL', PL": polarizer

The invention claimed is:

1. An object capturing device configured to capture an object present in a measurement target space, the object capturing device comprising:
   a light emission unit;
   a light receiving unit;
   a light scanning unit configured to cause measurement light emitted at a predetermined wavelength from the light emission unit to head toward a measurement target space to perform scanning, and to guide reflected light from an object present in the measurement target space with respect to the measurement light to the light receiving unit;
   a polarization filter disposed in the light scanning unit, the polarization filter including a polarizer configured to allow only light vibrating in a first direction in the measurement light to transmit, and an analyzer configured to allow only light vibrating in a second direction perpendicular to the first direction in the reflected light to transmit;
   a circular polarizing plate disposed between the light emission unit and the polarizer; and
   a second polarizer disposed between the light emission unit and the circular polarizing plate.

2. The object capturing device according to claim 1, wherein the light scanning unit comprises
   a polarization mirror, and
   a light guide unit defining an optical path configured to guide measurement light polarized by the polarization mirror to the measurement target space and an optical path configured to guide the reflected light to the light receiving unit, and
   wherein the polarizer is disposed on a measurement light optical path side of the light guide unit, and the analyzer is disposed on a reflected light optical path side of the light guide unit.

3. The object capturing device according to claim 2,
   wherein the object capturing device comprises a casing, and
   wherein the casing has a part serving as a path for the measurement light and the reflected light, the part being configured to allow the measurement light to transmit, the part being made of a material having low polarization properties with respect to the measurement light.

4. The object capturing device according to claim 2, wherein the light emission unit comprises a plurality of light sources configured to emit light at different wavelengths, the light emission unit being switched and driven in synchronization with a scanning cycle of the light scanning unit.

5. The object capturing device according to claim 1,
   wherein the object capturing device comprises a casing, and
   wherein the casing has a part serving as a path for the measurement light and the reflected light, the part being configured to allow the measurement light to transmit, the part being made of a material having low polarization properties with respect to the measurement light.

6. The object capturing device according to claim 5, wherein the light emission unit comprises a plurality of light sources configured to emit light at different wavelengths, the light emission unit being switched and driven in synchronization with a scanning cycle of the light scanning unit.

7. The object capturing device according to claim 1, wherein the light emission unit comprises a plurality of light sources configured to emit light at different wavelengths, the light emission unit being switched and driven in synchronization with a scanning cycle of the light scanning unit.

8. An object capturing device configured to capture an object present in a measurement target space, the object capturing device comprising:
   a light emission unit;
   a light receiving unit; and
   a light scanning unit configured to cause measurement light emitted at a predetermined wavelength from the light emission unit to head toward a measurement target space to perform scanning, and to guide reflected light from an object present in the measurement target space with respect to the measurement light to the light receiving unit,
   wherein the light scanning unit includes a light guide unit defining an optical path configured to guide measurement light polarized by a polarization mirror to the measurement target space and an optical path configured to guide the reflected light to the light receiving unit, and
   wherein a half mirror configured to guide the reflected light to the light receiving unit is disposed on a measurement light optical path side of the light guide unit.

9. The object capturing device according to claim 8,
   wherein the object capturing device comprises a casing, and
   wherein the casing has a part serving as a path for the measurement light and the reflected light, the part being configured to allow the measurement light to transmit, the part being made of a material having low polarization properties with respect to the measurement light.

10. The object capturing device according to claim 8, wherein the light emission unit comprises a plurality of light sources configured to emit light at different wavelengths, the light emission unit being switched and driven in synchronization with a scanning cycle of the light scanning unit.

* * * * *